US011676389B2

(12) United States Patent
DeAngelus et al.

(10) Patent No.: US 11,676,389 B2
(45) Date of Patent: Jun. 13, 2023

(54) FORENSIC VIDEO EXPLOITATION AND ANALYSIS TOOLS

(71) Applicant: Massachusetts Institute of Technology, Cambridge, MA (US)

(72) Inventors: Marianne A. DeAngelus, Somerville, MA (US); Jason R. Thornton, Chelmsford, MA (US); Ronald Duarte, Warwick, RI (US); Aaron Z. Yahr, Somerville, MA (US); Christine M. Russ, Stoneham, MA (US); Zach Elko, Wilmington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/879,508

(22) Filed: May 20, 2020

(65) Prior Publication Data
US 2020/0374491 A1 Nov. 26, 2020

Related U.S. Application Data

(60) Provisional application No. 62/850,384, filed on May 20, 2019.

(51) Int. Cl.
*G06V 20/40* (2022.01)
*H04N 13/221* (2018.01)
(Continued)

(52) U.S. Cl.
CPC ............. *H04N 7/181* (2013.01); *G06V 10/22* (2022.01); *G06V 10/44* (2022.01); *G06V 10/56* (2022.01);
(Continued)

(58) Field of Classification Search
CPC ........ H04N 7/181; H04N 5/272; H04N 7/188; G06V 10/56; G06V 20/49; G06V 10/44; G06V 10/22
(Continued)

(56) References Cited

U.S. PATENT DOCUMENTS 8,675,074 B2 * 3/2014 Salgar .................... H04N 7/181
348/159
10,215,585 B2 * 2/2019 Ofek ................... G06F 3/04815
(Continued)

OTHER PUBLICATIONS

DeAngelus et al., On-demand forensic video analytics for large-scale surveillance systems. IEEE International Symposium on Technologies for Homeland Security. Nov. 5, 2019;1-7.
(Continued)

*Primary Examiner* — Albert Kir
(74) *Attorney, Agent, or Firm* — McCarter & English, LLP

(57) ABSTRACT

Described herein are systems and methods for locating an object detected in a video. The system detects a bounding box at least partially around an object in a first frame at a first time in the video and a second frame in the video corresponding to a second time. The system determines whether there is no motion within the bounding box of the second frame. The system compares edge information, or color information, or intensity information associated with one or more pixels in the first frame, to edge information, or color information, or intensity information associated with one or more pixels within the bounding box. The system generates a score based on the comparison. The system further determines based on the score if the object is present in the second frame. The system also determines an estimated timeframe window of a first appearance of the object.

14 Claims, 22 Drawing Sheets

(51) Int. Cl.
  *H04N 7/18* (2006.01)
  *H04N 5/272* (2006.01)
  *G06V 10/22* (2022.01)
  *G06V 10/44* (2022.01)
  *G06V 10/56* (2022.01)

(52) U.S. Cl.
  CPC ............ *G06V 20/49* (2022.01); *H04N 5/272* (2013.01); *H04N 7/188* (2013.01)

(58) Field of Classification Search
  USPC ........................................................ 348/159
  See application file for complete search history.

(56) References Cited

U.S. PATENT DOCUMENTS

| | | | | |
|---|---|---|---|---|
| 10,242,501 | B1* | 3/2019 | Pusch | G06F 3/016 |
| 2007/0257985 | A1 | 11/2007 | Estevez et al. | |
| 2009/0265105 | A1* | 10/2009 | Davis | G01C 21/20 |
| | | | | 701/300 |
| 2010/0002082 | A1* | 1/2010 | Buehler | G08B 13/19693 |
| | | | | 348/159 |
| 2013/0208124 | A1* | 8/2013 | Boghossian | G06K 9/3241 |
| | | | | 348/159 |
| 2014/0152836 | A1* | 6/2014 | Morris | G08B 13/19608 |
| | | | | 348/159 |
| 2014/0362225 | A1* | 12/2014 | Ramalingamoorthy | ...................... G06V 40/20 |
| | | | | 348/159 |
| 2018/0308243 | A1* | 10/2018 | Justice | G06T 7/246 |
| 2020/0073642 | A1* | 3/2020 | Koryakin | G06F 8/34 |

OTHER PUBLICATIONS

Qiu et al., Kestrel: video analytics for augmented multi-camera vehicle tracking. IEEE/ACM Third International Conference on Internet-Of-Things Design and Implementation (IOTDI). Apr. 17, 2018;48-59.

International Search Report and Written Opinion for Application No. PCT/US2020/033833, dated Oct. 22, 2020, 15 pages.

* cited by examiner

FORENSIC VIDEO EXPLOITATION AND ANALYSIS TOOLS

CROSS-REFERENCE TO RELATED PATENT APPLICATIONS

This application claims priority to U.S. Provisional Application No. 62/850,384, filed on May 20, 2019, the content of which is hereby incorporated by reference in its entirety.

STATEMENT OF GOVERNMENT INTEREST

This invention was made with Government support under Grant No. FA8702-15-D-0001 awarded by the U.S. Air Force. The Government has certain rights in the invention.

TECHNICAL FIELD

The present disclosure relates to techniques for video surveillance. More specifically, the present disclosure relates to methodologies, systems and devices for locating an image in time in a video stream, for example, a first occurrence of the object and if needed tracking the object across a field of view of two or more cameras.

BRIEF DESCRIPTION OF THE DRAWINGS

The foregoing and other features and advantages provided by the present disclosure will be more fully understood from the following description of exemplary embodiments when read together with the accompanying drawings, in which.

DETAILED DESCRIPTION

Figure 1:
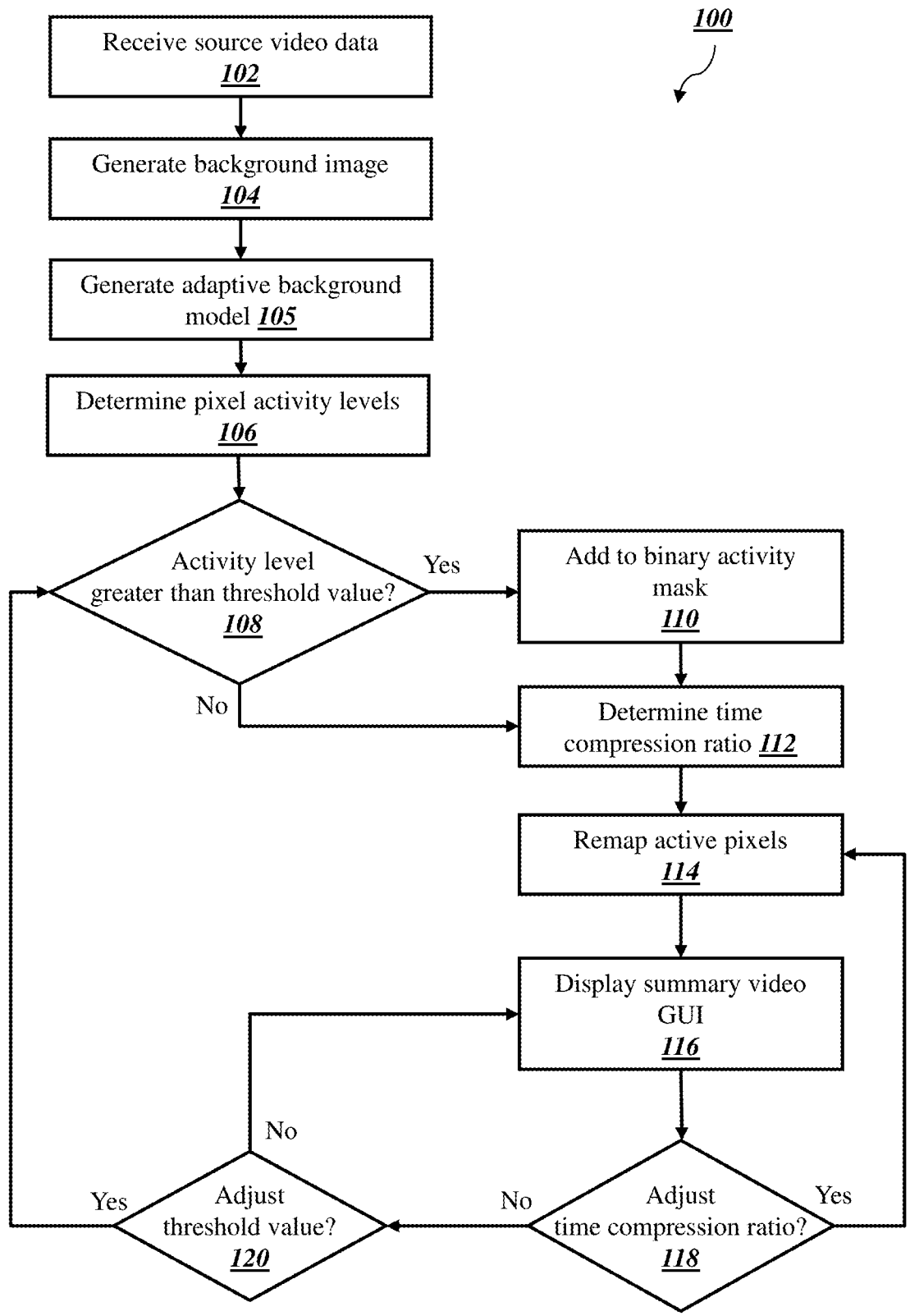
FIG. 1 is a flowchart illustrating an exemplary method for creating a summary video, according to embodiments of the present disclosure.

Described herein are tools for real time and on demand video forensic videos analysis across multiple videos streams. The tools allow for forensic video analysis to, for example, identify when an object was left in the field of view of one or more cameras in an on demand fashion. The time at which the object was placed in the field of view of the one or more cameras may be approximated by comparing a plurality of frames from video footage of the one or more cameras to determine any differences in information between the frames. For example, the edge, color, and intensity information in the frames are compared between the frames over a period of time starting from a reference point when the object was first identified in the field of view of the one or more cameras going backwards in time to when the object was not in the field of view of the one or more cameras. The edge, color, and intensity information in the frames are also compared between the frames over that same period of time starting from the time when the object was not in the field of view of the one or more cameras to a time that is before the time corresponding to the reference point. The tool can continue the process of moving backwards and forwards in time and comparing the edge, color, and intensity information over smaller increments of time to determine when the object was placed in the field of view of the one or more cameras.

As another example of video forensic tools described herein, a tool for reconstructing video from one or more cameras is also provided. The tool allows a user to track an object as it moves from a field of view of one camera into a field of view of another camera by utilizing transition zones linking the two cameras and using anchor points to annotate the presence of the object at a particular time in the field of view of one or more cameras. The transition zones serve to cause the tool to switch from displaying video footage from one camera to video footage from another camera.

As another example of video forensic tools described herein, a video summarization tool is taught herein. A video summarization begins with an activity detection step. The purpose of this step is to process the source video, represented as a three-dimensional function of space and time $I(\vec{x},t)$, and extract an activity function $A(\vec{x},t)$ indicating the degree of apparent activity within each pixel. Activity levels can be measured using, for example, a pixel-wise adaptive background subtraction model followed by local neighborhood morphological operations like dilation and erosion in order to remove noise and fill in holes. The adaptive background model is a characterization of the background within a certain number of frames before and after each frame of the source video. As such, the adaptive background model is not a static image, but rather an adaptive model of the background that updates over time and can account for ambient changes in light. In addition to this adaptive background model, a background image may be generated, which can be formed by taking the median value of each pixel found in the source video of interest. This background may be denoted as a background image $I_B(\vec{x})$, which forms the backdrop of the summary video, onto which active foreground pixels are copied.

In general, a summary video may be defined by the following parameters: the time interval of the source video sequence spanning $N_0$ frames, the frame length of the summary video $N_1$ which can be determined based on a time compression ratio, and a motion sensitivity threshold value $\omega$. In exemplary embodiments, the summary video can be displayed to a user via a graphical user interface (GUI) that includes parameter controls, which allow a user to dynamically adjust the summary video parameters, including the motion sensitivity and time compression ratio of the summary video. In exemplary embodiments, such controls allow the user to go from sparse visual representations of activity all the way to a dense single-frame representation, which is a static map of all activity in the scene, and anywhere along the spectrum in between. Adjusting the motion sensitivity parameters allows a user to tradeoff between activity detection and clutter suppression, in order to capture the most meaningful content in the summary view. These parameter controls, coupled with the viewing interface, encourage a remarkably effective interactive style of video review and dynamic content exploration.

Exemplary embodiments are described below with reference to the drawings. One of ordinary skill in the art will recognize that exemplary embodiments are not limited to the illustrative embodiments, and that component of exemplary systems, devices and methods are not limited to the illustrative embodiments described below.

As used herein, the term object refers to a physical object such as a box, a bag, a piece of luggage, a vehicle, a human, an animal, and so on.

FIG. 1 is a flowchart illustrating an exemplary method 100 for creating a summary video, according to embodiments of the present disclosure. The exemplary method 100 is described in reference to the block diagram 900, discussed in more detail below. In step 102, a source video is received. In exemplary embodiments, the source video may be received from a video input device 924, such as one or more surveillance cameras, or from a database or storage that has archived or stored video data. In exemplary embodiments, the source video includes a number of source frames, $N_0$. A background image $I_B$ is generated in step 104. The background image can be generated, for example, using the background pixel detection module 930. As discussed above, the background image $I_B$ may be generated as the set of median pixel values of the $N_0$ frames of the source video of interest. For ease of description, examples are provided herein with RGB pixel values.

Once the background image $I_B$ has been generated, the method may continue with step 105 and generate an adaptive background model. This adaptive background model may be generated using the background pixel detection module 930, and is a characterization of the background over a temporally local span of the source video. In exemplary embodiments, the adaptive background model includes median pixel values from a span or subset of source video frames surrounding a specific source video frame, such that the adaptive background model reflects the evolving light conditions of a scene. Once the adaptive background model is generated, the activity level for pixels within the source video is determined in step 106. This step may be performed, for example, using the active pixel detection module 928. In exemplary embodiments, the source video segment to be reviewed is scanned for detected motion at the pixel level. In one embodiment, each pixel in the source video is assigned a discrete activity score of zero (indicating a static background pixel) or 1 through 255 (indicating degree of apparent motion), using an adaptive background subtraction model. The background subtraction model compares the value of each pixel within a source video frame against the spatially corresponding pixel of an adaptive background model. The activity level of each pixel may be saved, in some embodiments, as an activity map $A(\vec{x},t)$ at each frame. The pixel activity level may be stored, for example, in the active pixel storage module 938. In many surveillance scenarios, the nonzero values of this activity map are sparsely distributed because the majority of pixels depict static scene components. Therefore, only the non-zero activity map values are stored. For each pixel where $A(\vec{x},t>0)$, the location value activity level $A(\vec{x},t)$, and Red Green Blue (RGB) pixel value $I(\vec{x},t)$ are stored. At each frame of the source video, the list of active pixels may be sorted in ascending order by activity score to accommodate efficient retrieval of active pixels exceeding the user-controlled motion sensitivity threshold.

As discussed above, the summary video is generally defined by the following parameters: the time interval of the source video sequence spanning $N_0$ frames, the frame length of the summary video $N_1$, and a motion sensitivity threshold value (represented by "ω" in the equations below). Once the pixel activity level is calculated in step 108, it is computationally determined whether the activity level of each pixel in the source video is greater than the motion sensitivity threshold value. In exemplary embodiments, this may be achieved by retrieving the relevant subset of active pixels (with activity scores exceeding the threshold value ω) for each source frame. In embodiments where the pixel activity level $A(\vec{x},t)$ is pre-sorted in ascending order, this amounts to finding the first pixel exceeding the motion sensitivity threshold value and retrieving all subsequent pixels in the array.

If the activity level of a pixel is greater than the motion sensitivity threshold value, then in step 110 the selected pixel is added to a binary activity mask. In exemplary embodiments, the binary activity mask function $M(\vec{x},t)$ may be defined according to equation (1) below:

$$M(\vec{x}, t) = \begin{cases} 1 & \text{if } A(\vec{x}, t) \geq \omega \\ 0 & \text{if } A(\vec{x}, t) < \omega \end{cases} \quad (1)$$

This binary activity mask may be saved using an efficient data structure, for example, sparse sets of motion pixels, sorted into lookup tables by frame number and motion score. The data structure is designed to minimize the time required to access active pixels during the synthesis of summary video frames. In exemplary embodiments, the objective of the summary video is to map all pixels with a binary activity mask value of 1 into the summary video. Since this mapping is done at the pixel level and not at the activity tube level, no tracking is required at this stage. Instead, an accumulated activity count function can be generated, $C(\vec{x},t)$, with the same time span as the summary video ($0<t<N_1$), by summing over periodic frames of the mask function according to equation (2) below:

$$C(\vec{x}, t) = \sum_{k=0}^{\lceil \frac{N_0-t}{N_1} \rceil - 1} M(\vec{x}, kN_1 + t) \quad (2)$$

Once the selected pixel is added to the binary activity mask in step 110, a time compression ratio is determined in step 112, which determines the final length of the summary video. For example, a compression ratio of two cuts the source video in half resulting in a summary video having a summary video frame number $N_1$ one half the source video frame number $N_0$. Similarly, a compression ratio of eight results in a summary video one-eighth the duration of the source video. If, however, it is determined in step 108 that the pixel activity level is not above the motion sensitivity threshold value, the time compression ratio is determined in step 112 without adding the pixel to the binary mask in step 110. Once the two parameters of the time compression ratio and the motion sensitivity threshold value are known, generation of the summary video frames may be performed by remapping active pixels over the background image in step 114. In exemplary embodiments, the summary frames and the summary video may be created using the summary frame creation module 946 and the summary video creation module 934.

In exemplary embodiments, a summary sequence $I_S$ is a sequence of individual summary video frames that are each a composite of the background image $I_B$, and the remapped foreground components. The time to compute a single summary frame depends on the length of and amount of activity in the original surveillance video. For example, the creation of a summary video based on a one hour surveillance source video may range from approximately five to fifteen milliseconds, in some embodiments, which is fast enough to support real-time frame generation. In exemplary embodiments, the summary sequence $I_S$ may be generated according to equation (3) below:

$$I_S(\vec{x}, t) = \begin{cases} I_B(\vec{x}) & \text{if } C_S(\vec{x}, t) = 0 \\ I_F(\vec{x}, t) & \text{otherwise} \end{cases} \quad (3)$$

where $I_F$ is computed by collecting any activity at that pixel location across frames that are evenly spaced in the source video timeline, according to equation (4) below:

$$I_F(\vec{x}, t) = \frac{\sum_{k=0}^{\lceil \frac{N_0-t}{N_1} \rceil - 1} I(\vec{x}, kN_1 + t) M(\vec{x}, kN_1 + t)}{C(\vec{x}, t)} \quad (4)$$

This is a cyclical mapping procedure where a foreground pixel appearing at location $(\vec{x},t)$ in the source video appears at location $\text{mod}(\vec{x}, \text{mod}(t, N_1))$ in the summary video, blended with any other foreground pixels mapped to the same location. This pixel-based remapping technique preserves the following important temporal continuity property of the source video: If pixel $p_1$ is at $(\vec{x}_1, t)$ and pixel $p_2$ is at $(\vec{x}_2, t+\Delta t)$, with $(0 \leq \Delta t - N_1)$, then pixel $p_2$ appears $\Delta t$ frames after $p_1$ in the resulting summary video (assuming that video is played on a loop). Therefore, even though the remapping is performed at the pixel level, rather than the object or track level, foreground objects and local activity sequences remain intact in the summary video.

Once the active pixels are remapped into a summary video, the summary video may be displayed to a user via a GUI at step 116. As discussed above, in exemplary embodiments the GUI allows a user to dynamically adjust the time compression ratio or the motion sensitivity threshold value or both. While the summary video is being displayed via the GUI, the time compression ratio may be adjusted in real time by the user at the GUI in step 118. If the time compression ratio is adjusted in step 118, the method may return to step 114 and remap the active pixels again based on the new time compression ratio and display the new summary video to the user via the GUI in 116.

If the time compression ratio is not adjusted, then in step 120 it is computationally determined whether the motion sensitivity threshold value is being adjusted by the user in real time via the GUI. If the motion sensitivity threshold value is not adjusted, the method continues to display the summary video to the user via the GUI in step 116. If, however, the motion sensitivity threshold value is adjusted, the method may return to step 108 and computationally determine whether the activity levels of each pixel are greater than the new threshold value. The method then continues with the subsequent steps 110-116, displaying the new summary video to the user via the GUI based on the new motion sensitivity threshold value. In some embodiments, the GUI can be generated by GUI 932 of an exemplary computing device 900.

Figure 2:
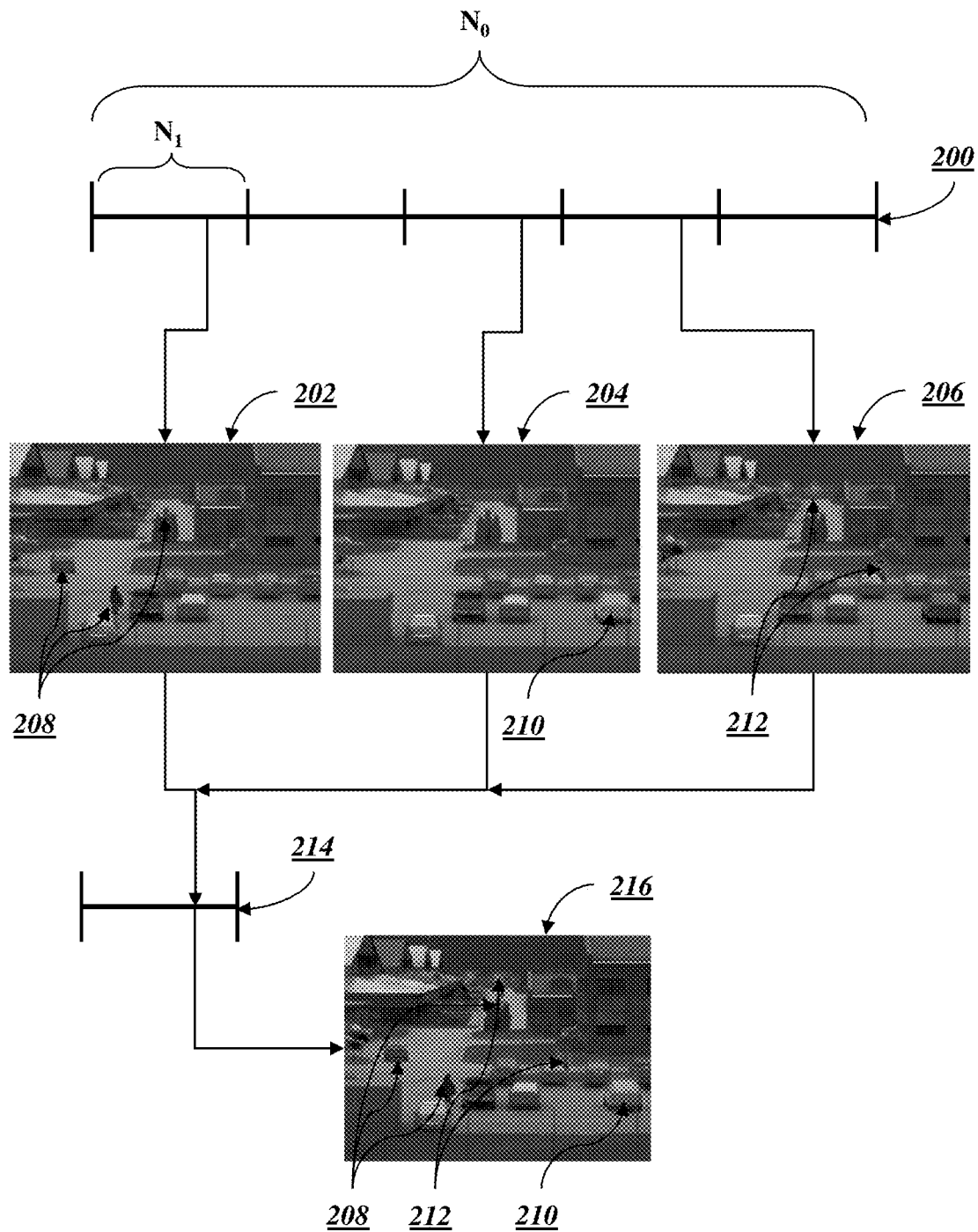
FIG. 2 is an exemplary video timeline illustrating the formation of a summary video frame in accordance with exemplary embodiments of the present disclosure.

FIG. 2 is a diagram illustrating the formation of a summary video frame 214 in accordance with exemplary embodiments of the present disclosure. In exemplary embodiments, a source video 200, having a number of frames $N_0$, is divided into smaller segments each having a number of frames $N_1$, equal to the number of frames in the summary video. In this embodiment, the source video is sampled at the same time within each of the smaller segments and source video frames 202, 204, and 206 are shown in which activities are detected. Specifically, activities 208 are detected within frame 202, activity 210 is detected within frame 204, and activities 212 are detected within frame 206. As discussed above, the active pixels associated with activities 208, 210, and 212 are combined and remapped over a background image to produce summary frame 216, which includes a composite of all the detected motions or activities 208, 210, and 212. This process is performed for all of the $N_1$ frames of the summary video 214 in order to form the final summary video. Note that, as discussed above, activities which co-occur in the source video sequence 200, such as activities 212, also co-occur in the summary video 214.

Figure 3:
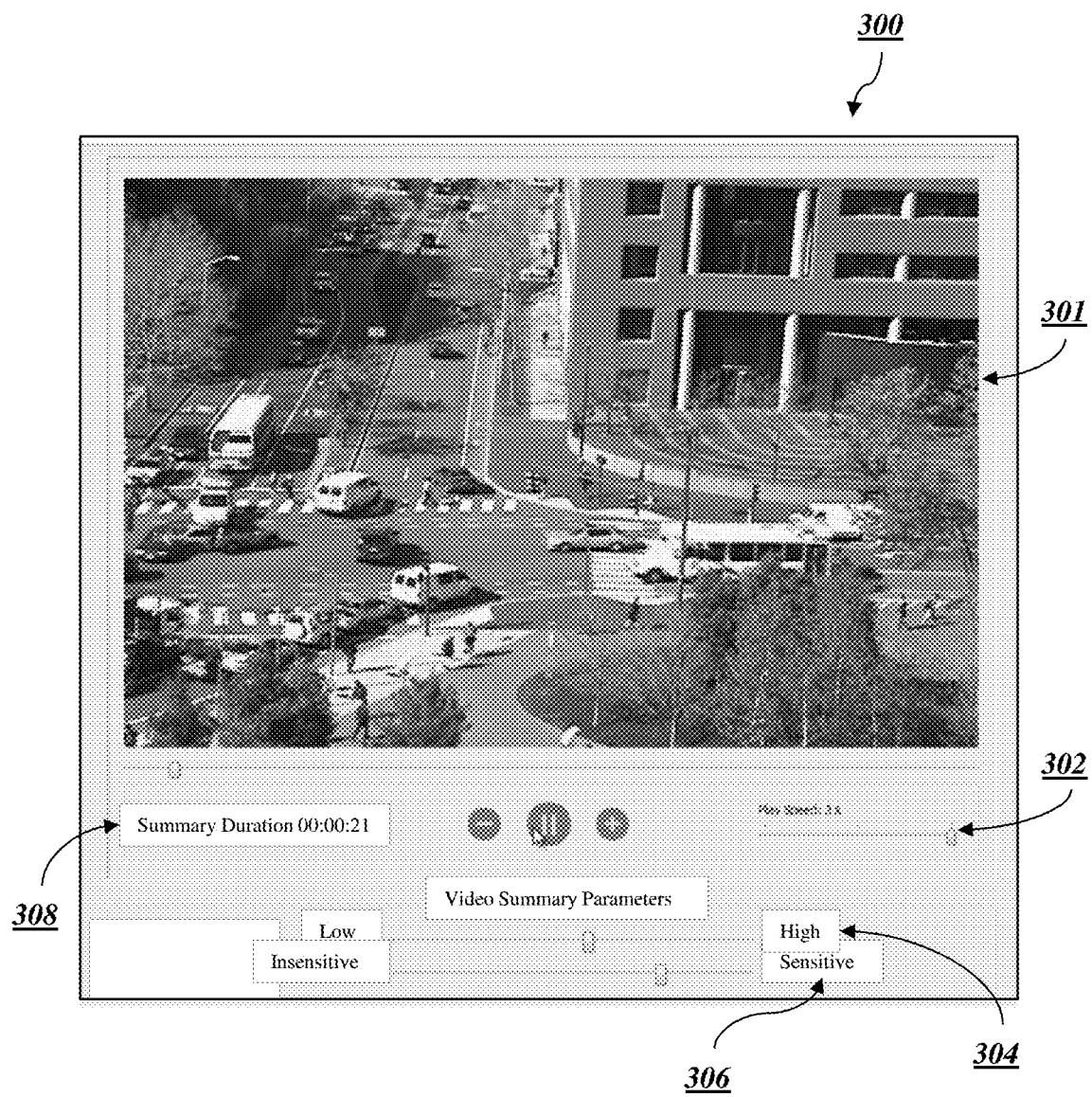
FIG. 3 depicts a screenshot of a graphical user interface for displaying a summary video, in accordance with exemplary embodiments of the present disclosure.

FIG. 3 depicts a screenshot of an example GUI 300 for displaying a summary video, in accordance with exemplary embodiments of the present disclosure. In exemplary embodiments, a GUI displays the summary video to a user and provides the user with instantaneous control over the key parameters of the summary video formation. For example, the GUI may display a first slider bar to control the duration of the summary clip, and therefore the ratio of time compression, and a second slider bar to control the motion sensitivity threshold that determines which pixels are considered to be part of the foreground and mapped into the summary video. In addition, the GUI can allow the viewer to click on a specific pixel in the summary clip and jump to the corresponding frame of the original source video containing that piece of activity. In some embodiments, if the camera or video input device moves, a new background may be computed along with a new summary video for that particular point of view.

The GUI can be generated by GUI 932 of an exemplary computing device 900, as discussed in greater detail below. In exemplary embodiments, the GUI includes a window 301 for displaying a summary video to a user. The GUI also includes a playback speed control bar 302, a time compression control bar 304, a motion sensitivity control bar 306, and a summary video duration indicator 308. The playback speed control bar determines the rate at which new summary frames are displayed from the summary video sequence, which the user may speed up or slow down. In exemplary embodiments, a time compression slider bar or control bar 304 is associated with the time compression ratio (or video summary frame length) and allows the viewer to instantaneously change from a lower compression ratio generating a longer summary video that provides clearer views of individual activity components, to a much higher compression ratio that generates a more condensed summary video showing more dense activity patterns. As the time compression control bar 304 is adjusted, the duration of the summary video, indicated by the summary video duration indicator 308, also changes. The GUI 300 may also include other video control features that allow the user to, for example, zoom in, zoom out, play, pause, rewind, and/or fast-forward a summary video.

In exemplary embodiments, a motion sensitivity control bar 306 allows a user to achieve a desired balance between activity detection and clutter suppression by dynamically adjusting the motion sensitivity threshold value (the $\omega$ parameter). For example, a lower motion sensitivity threshold value results in greater activity or motion detection, but may also result in false activity detection caused by shadows or other minor changes in pixel value that do not represent actual activity in the video frame. In contrast, a higher motion sensitivity threshold value eliminates clutter and many false activity detections, but may miss parts of actual activity within a frame. Using the motion sensitivity control bar 306, the user may adjust the sensitivity between sensitive and insensitive to find the desired balance.

Figure 4A:
FIGS. 4a-4c depict screenshots of a graphical user interface for displaying a summary video, in accordance with exemplary embodiments of the present disclosure.
Figure 4B:
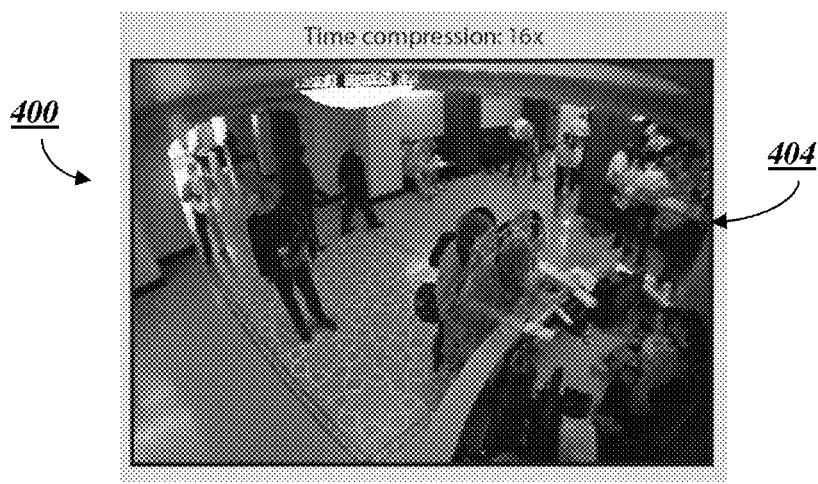
Figure 4C:

FIGS. 4a-4c are screenshots of compressed summary videos that may be displayed via the GUI 400, in accordance with exemplary embodiments of the present disclosure. In exemplary embodiments, once the activity levels of pixels from the source video are pre-computed, a summary video can be generated at a desired compression ratio as needed for viewing.

FIG. 4a is a screenshot of the GUI 400 showing a window 402 displaying a summary video that has compressed the source video to one eighth its original length. In other words a compression ratio of eight-to-one has been applied to the source video to produce the summary frame 402.

Similarly, FIG. 4b is a screenshot of the GUI 400 showing a window 404 displaying a summary video with a sixteen-to-one compression ratio.

FIG. 4c is a screenshot of the GUI 400 showing a window 406 displaying a summary video with a thirty two-to-one compression ratio. As can be seen, a greater activity overlap occurs in summary videos that have a higher compression ratio. In exemplary embodiments, the time compression ratio may be adjusted in real time using a GUI control feature, such as the time compression control bar 304 shown in FIG. 3.

In summary videos having a higher time compression ratio, like the one shown in FIG. 4c, pixel overlap may occur, which can result in lack of clarity in the summary video. In order to avoid visual confusion where there is pixel overlap, an overlapping pixel may be given more weight in the summary video if it has a greater contrast from the background image. Pixel overlap may also be mitigated by the fact that the operator has dynamic control (i.e., real time) of the time compression ratio, and therefore the observed activity density.

In some embodiments, the active pixels from the source video (having a number of frames $N_0$) can be remapped to the compressed summary video (having a number of frames $N_1$) in blocks of $N_1$ consecutive frames. In an alternative embodiment, in order to leave room to minimize activity overlap, slightly smaller blocks having a length $N_2 < N_1$ consecutive frames can be transferred, leaving some margin for translation in the mapping. Each block of frames can then start at any frame from 0 to $N_1 - N_2 - 1$ in the summary timeline. The start frame of the kth block can be denoted by lag variable $L_k$, which represents a degree of freedom in the optimization process. This is equivalent to the method described in the previous section in which $N_2$ is equal to $N_1$ and all $L_k$ are constrained to zero. In order to describe this modified mapping approach, an indicator function is introduced which equals 1 if block k contributes any foreground pixels to summary frame t, according to the set of lag variables:

$$\delta(k, t) = \begin{cases} 1 & \text{if } L_k \leq t < N_2 + L_k \\ 0 & \text{otherwise} \end{cases} \quad (5)$$

Consequently, the counting function of equation (2) may be rewritten according to equation (6) presented below:

$$C(\vec{x}, t) = \sum_{k=0}^{\lceil \frac{N_0-t}{N_1} \rceil - 1} \delta(k, t) \cdot M(\vec{x}, kN_2 - L_k + t) \quad (6)$$

Similarly, the mapped images calculated in equation (4) above may be rewritten according to equation (7) below:

$$I_F(\vec{x}, t) = \frac{\sum_{k=0}^{\lceil \frac{N_0-t}{N_1} \rceil - 1} \delta(k, t) \cdot I_M(\vec{x}, kN_2 - L_k + t)}{C(\vec{x}, t)} \quad (7)$$

Where image $I_M$ is shorthand notation for the product of the image sequence and its activity mask, calculated according to equation (8) below:

$$I_W(\vec{x}, t) = I(\vec{x}, t) \cdot M(\vec{x}, t) \quad (8)$$

The relative time shifts of the mapped activity blocks provide an effective mechanism for reducing overlap. The values of $L_O \ldots L_K$ may be optimized to minimize the sum of all overlapping foreground pixels in the summary video, using an iterative hill-climbing optimization procedure (for some standard variant, such as simulated annealing, that is less likely to converge on poor local minimum of the cost function). As a result, this alternative embodiment allows for a reduction in activity overlap in the summary video at the cost of additional computation to run the optimization procedure.

Figure 5A:
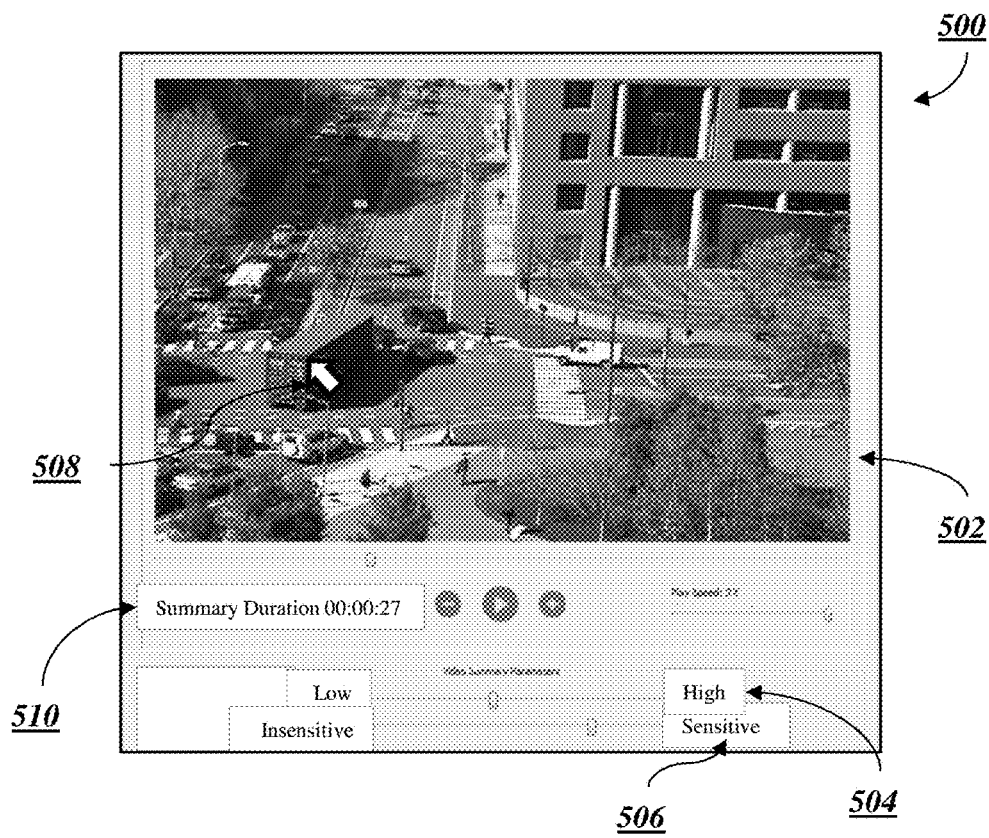
FIG. 5a depicts a screenshot of a graphical user interface for displaying a summary video, in accordance with exemplary embodiments of the present disclosure.
Figure 5B:
FIG. 5b depicts a screenshot of a graphical user interface for displaying a source video, in accordance with exemplary embodiments of the present disclosure.

FIGS. 5a-5b depict screenshots of an example GUI 500 that can be generated in accordance with exemplary embodiments of the present disclosure for accessing a portion of a source video from a summary video. As discussed above, a summary video can be used as a visual index into the original source video, with each active pixel being linked to its corresponding frame in the source video. For example, a user can navigate between a summary video and a source video by selecting an object of interest using, for example, a touch screen, a mouse or other pointing device, and accessing to the relevant portion of the source video that displays the selected object. Thus, a summary video can serve as a navigation tool to more easily find and access activities within a source video.

FIG. 5a shows a window 502 displaying a summary video, along with various GUI controls, as described above in reference to FIG. 3. Specifically, a summary video duration indicator 510 shows the time-length of the summary video shown in window 502, the time compression control bar 504 shows the value of the time compression ratio used for this specific summary video, the motion sensitivity control bar 506 shows the value of the motion sensitivity threshold value used for this specific summary video, and cursor 508 shows the GUI cursor. The summary video shown in window 502 displays a number of activities on a street intersection, and the cursor 508 is hovering over a large semi-truck. By selecting the truck, the user can access the section of the source video where the truck was found. In other words, by selecting the truck in the summary video, the user can access the portion of the source video from which the active pixels of the truck were detected.

FIG. 5b shows the relevant source video in window 512 after the user has selected the truck using the cursor 508. As can be seen, the activity shown in the source video window 512 is less dense than that shown in window 502, and the source video time-stamp indicator 514 displays the time-stamp of the source frame being displayed in window 512. Thus, using the summary video as an index into the source video, a user can select an activity and jump to the corresponding point in time in the source video to examine that activity more closely.

Figure 6:
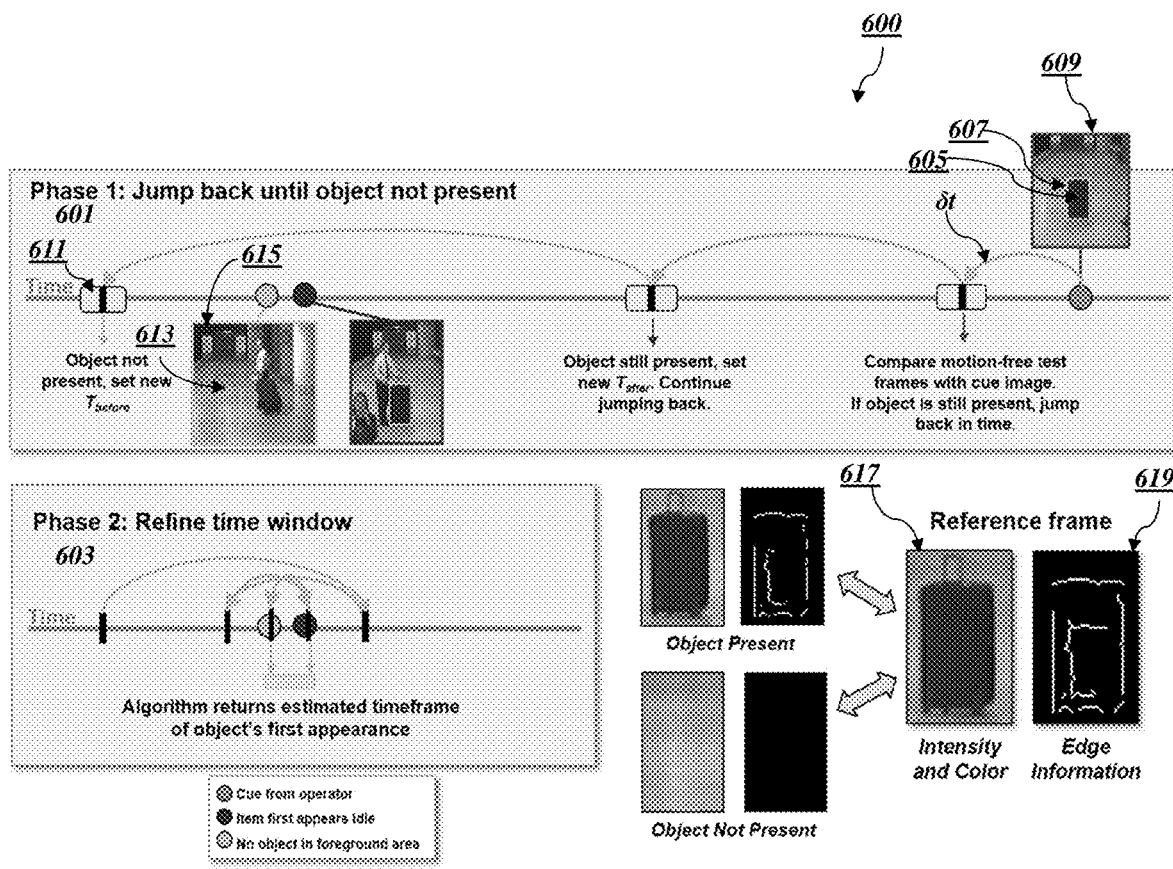
FIG. 6 is a diagram of an exemplary jump back process in accordance with exemplary embodiments of the present disclosure.

FIG. 6 is a diagram of an exemplary jump back process provided by a jump back video forensic tool in accordance with exemplary embodiments of the present disclosure. The exemplary jump back process may be implemented by jump back module 948 in FIG. 9. The jump back module addresses the need to quickly evaluate, for example, in real time fashion, the context surrounding a left-behind or otherwise suspicious item, which is a common task for video operators. In some embodiments, given an idle object in the scene, the jump back module 948 automatically jumps to the time period in the video when the object first appeared. In some embodiments, given an idle object in the scene, the jump back module 948 can alert a human operator, who then can initiate a jump back task (process) to jump to the time period in the video when the object first appeared. At this point the operator can evaluate the context of the situation and respond accordingly. The jump back task may mimic how a human operator might approach this task. Rather than simply rewinding the video, which could take a considerable amount of time, a user might directly jump backward in time using a best guess of when the object was likely to have been placed. Because the object may have been present for only minutes or potentially days, the algorithm(s) as taught herein adapt by searching in a non-linear fashion. For example, in a first jump back phase, the algorithm(s) jumps backward in time, with exponentially increasing time deltas, until the object is deemed not present. In the second jump back phase, the algorithm(s) execute a divide-and-conquer approach to refine the estimate of the time window surrounding the object's first appearance.

In some embodiments, the jump back process 600 may include a first phase (phase 1 601) and second phase (phase 2 603). In phase 1 601 the jump back process 600 may receive a user input corresponding to a user drawing a bounding box 607 around or partially around an image corresponding to object 605 in image chip 609. In this instance object 605 may be a suitcase. Image chip 617 can serve as a "cue" or reference frame from which edge, color, and intensity information is extracted. A chip may be referred to as cropped subset of an original image. The chip can be the content of the original image within bounding box 607, which corresponds to image chip 617. As detailed in Algorithm 1, the algorithm then jumps back, from image chip 609 by an initial time duration δt and performs the following operations.

---
Algorithm 1 Jump back until object not present
---

$t_{cue}$ : time of cue bounding box
$t_{eval}$: time of frame under evaluation
while object is present do
    N ← N + 1
    $t_{eval}$ ← $t_{prev}$ − ($\delta t^N$)
    $t_{prev}$ ← $t_{eval}$
    if no motion within region of interest then
        score ← image comparison (intensity, color, edge content)
        if score > threshold then
            set object not present
            return $T_{before}$ ← $t_{eval}$
        end if
    end if
end while

---

The first operation is motion estimation. After jumping back in time, the motion within the bounding box is evaluated over a short time window. In some embodiments the time window can be less than 10 seconds. For instance the motion within the bounding box may be determined based on determined pixel activity levels in step 106 of FIG. 1. If there is no motion within the bounding box during this window, a comparison is made between the object in or across the short time window to the object in or across a window of time when the bounding box is first placed around the object. The video frame corresponding to the window of time when the bounding box is first placed around the object may be referred to as the cue reference frame. The video frame corresponding to the short time window may be referred to as a test frame. The window of time when the bounding box was first placed around the object is later in time than the short time window. The comparison, which is described below, may be performed to see whether the object is still present. If the amount of motion exceeds a certain threshold, it is deemed that the object is temporarily occluded by the motion of people walking in front of it. The jump back algorithm(s) (depicted as algorithm 1 above) does not make a comparison and instead continues jumping backward in time.

The second operation may be a comparison of image features. To determine whether the object is present, image features including the edge content, color, and pixel intensity are extracted. The frame being evaluated is compared to the cue reference frame. The algorithm is looking for significant change in shape and color rather than the explicit presence of an object against a known background, which would be a more computationally expensive approach. The known background may correspond to the background of the summary video.

Edge information may be extracted using a Canny edge detector algorithm, which produces a binary edge mask. The percentage of overlapping edge is computed by summing the pixel-wise overlap between edge masks of the cue frame and the frame under evaluation, and dividing by the number of edge pixels in the cue frame. This provides a metric for how well the content of the test frame matches the shape of the object in the cue frame.

Similarly, a pixel-by-pixel difference is calculated by subtracting the cue frame from the test frame, for each of three color channels. The images are first normalized so that any uniform shifts in lighting are removed. The absolute element-by-element difference is computed, summed, and normalized. This metric indicates significant change in color or intensity, and produces a high value when the content of the test frame does not match the cue frame.

Algorithm 1 computes a weighted difference, or score, between factors that indicate no change, and factors that indicate a significant change. The significant change may be a pixel-by-pixel difference between a cue frame and the test frame exceeding a user defined threshold thereby indicating that an object is no longer in the position that it was in, in the cue frame. A factor that may indicate no change may be the percentage of pixel-wise overlap between edge masks of the cue frame and the test frame. A factor that may indicate a significant change may be the change in color intensity determined by the absolute element-by-element difference described above. If this score exceeds a particular threshold, the object is deemed not present. Otherwise, the object is still present and the algorithm continues jumping back by an exponential scaling factor, N. The scaling factor (increasingly longer jumps) provides a balance between computation time and robustness to both short and long idle time periods. The cue image is periodically updated to alleviate mismatches caused by slowly changing illumination over long time periods.

In phase 2 the time window may be adjusted. In the second phase of processing (see Algorithm 2), Algorithm 2 jumps forward in time, halfway between "not present" and the earliest "still present" time. This divide-and-conquer approach is repeated until the estimated window for the object's appearance is narrowed to a reasonably small timeframe (e.g., 10 seconds). In some embodiments it is possible that phase 2 may not occur. For instance, if $T_{after}$−$T_{before}$ is not greater than the allowable time window after the jump back algorithm jumps backwards in time, then phase 2 would never take place.

---
Algorithm 2 Refine time window of object appearance
---

$T_{before}$: time before object appearance
$T_{after}$: time after object appearance, initialized to $t_{cue}$
while ($T_{after}$ − $T_{before}$) > allowable time window do
    evaluate at middle of time window
    $t_{eval}$ ← ($T_{before}$ − $T_{after}$)/2
    if object not present then
        $T_{before}$ ← $t_{eval}$
    else
        object still present
        $T_{after}$ ← $t_{eval}$
    end if
end while

---

Figure 7:
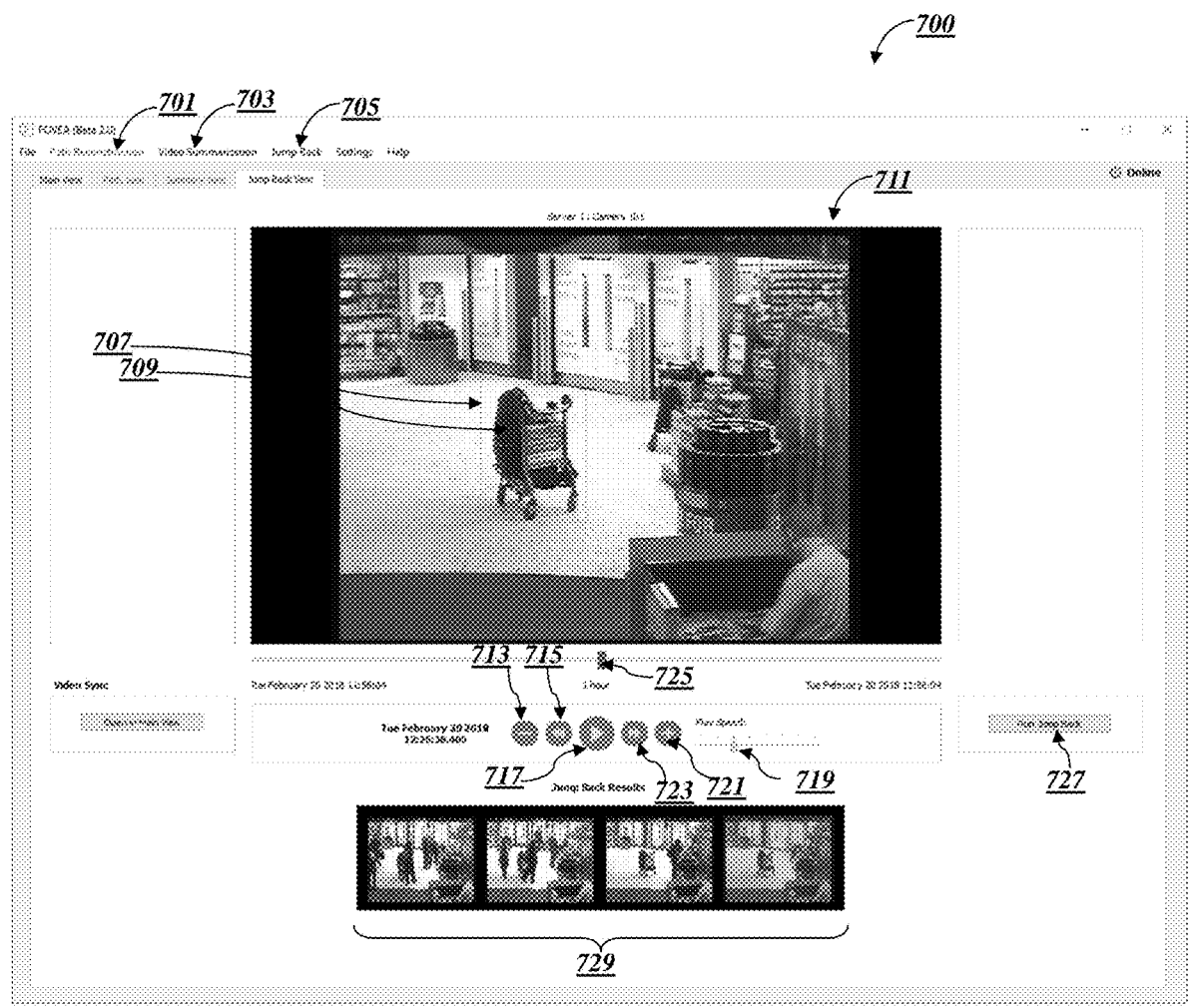
FIG. 7 depicts screenshots from a graphical user interface for displaying a jump back feature in accordance with exemplary embodiments of the present disclosure.

The user interface for viewing results from the Jump Back algorithms is shown in FIG. 7. The algorithms output several representative samples during the time window of the object's appearance.

The Jump Back algorithm (algorithm 1) often takes just a few seconds to find an object's first appearance, but can take tens of seconds if the object has been present for many hours or days. The rate at which frames can be retrieved from the video management system (VMS) significantly affects the total processing time. The parameters for δt and exponential scaling factor N can be tuned depending on the characteristics of the VMS and needs of the operator.

The Jump Back module 948 reduces the workload of human operators who receive many reports of left behind items, whether from observant passengers or other video monitoring systems. In addition to idle objects, the Jump Back tool can also be used as a general change detector for daily investigation tasks; for instance, determining when an object disappeared (e.g., stolen bike) or when an object's appearance changed (e.g., graffiti on a wall).

FIG. 7 depicts a screenshot of a graphical user interface 700 for displaying and reviewing a jump back feature in accordance with exemplary embodiments of the present disclosure. The graphical user interface 700 can begin playing video a few seconds before an object becomes idle.

Graphical user interface 700 can include one or more menus (path reconstruction menu 701, video summarization menu 703, and jump back menu 705). Path reconstruction menu 701 can display icons such as anchor points, or bookmarks, that upon activation allow a user to view a path traversed by an object in, and across, a plurality of fields of view corresponding to different cameras. For instance, path reconstruction menu 701, can display screens similar to those illustrated by the screen shots in FIGS. 8, 13, 14, and 16, and can be implemented as a result of execution of one or more instructions in path reconstruction module 950.

Video summarization menu 703 can be a menu that displays an exemplary GUI 300 for displaying a video summary as illustrated in FIG. 3. In some embodiments, video summarization menu 703 can display screens similar to those illustrated in FIGS. 4a-c which display compressed versions of a video. Video summarization menu 703 can be implemented as a result of execution of one or more instructions in summary video creation module 934.

Jump back menu 705 can be a menu that displays one or more controls (video speed decrease icon 713, rewind icon 715, play icon 717, fast forward icon 723, video speed increase 721, play speed 719, and slider bar 725). Jump back menu 705 can also include a run jump back icon 727, that a user can activate by clicking on the icon which can cause one or more processors to execute instructions in jump back module 948 thereby causing the jump back menu 705 to generate a plurality of frames 729, at least one of which includes an object of interest. For instance, each of the plurality of frames 729 can include object 709, which are retrieved over a period of time. The rightmost frame includes a clear image of object 709 similar to that shown in cue frame 711, without bounding box 707. Object 709 in the leftmost frame, of the plurality of frames 729, is obscured by a person, and therefore can correspond to a frame in which the Jump Back tool determines that object 709 is no longer present due to a pixel-to-pixel comparison as described above. The frames starting from the rightmost frame to the leftmost frame are frames selected by the Jump Back tool corresponding to test frames that occurred prior to cue frame 711, and that can be compared to cue frame 711 as the Jump Back tool selects the plurality of frames 729.

The lower portion of the interface displays several image clips 729 from the time period surrounding the object's appearance. In FIG. 7 the time period is from 11:56:04-12:56:04 which is a one hour period of time. Although the time period illustrated in FIG. 7 is one hour, the time period can be less than or greater than one hour. In some embodiments, this time period can be configured by the user. In other embodiments, one or more of the modules in FIG. 9, may determine an appropriate time period based on the user's observation patterns.

Figure 8:
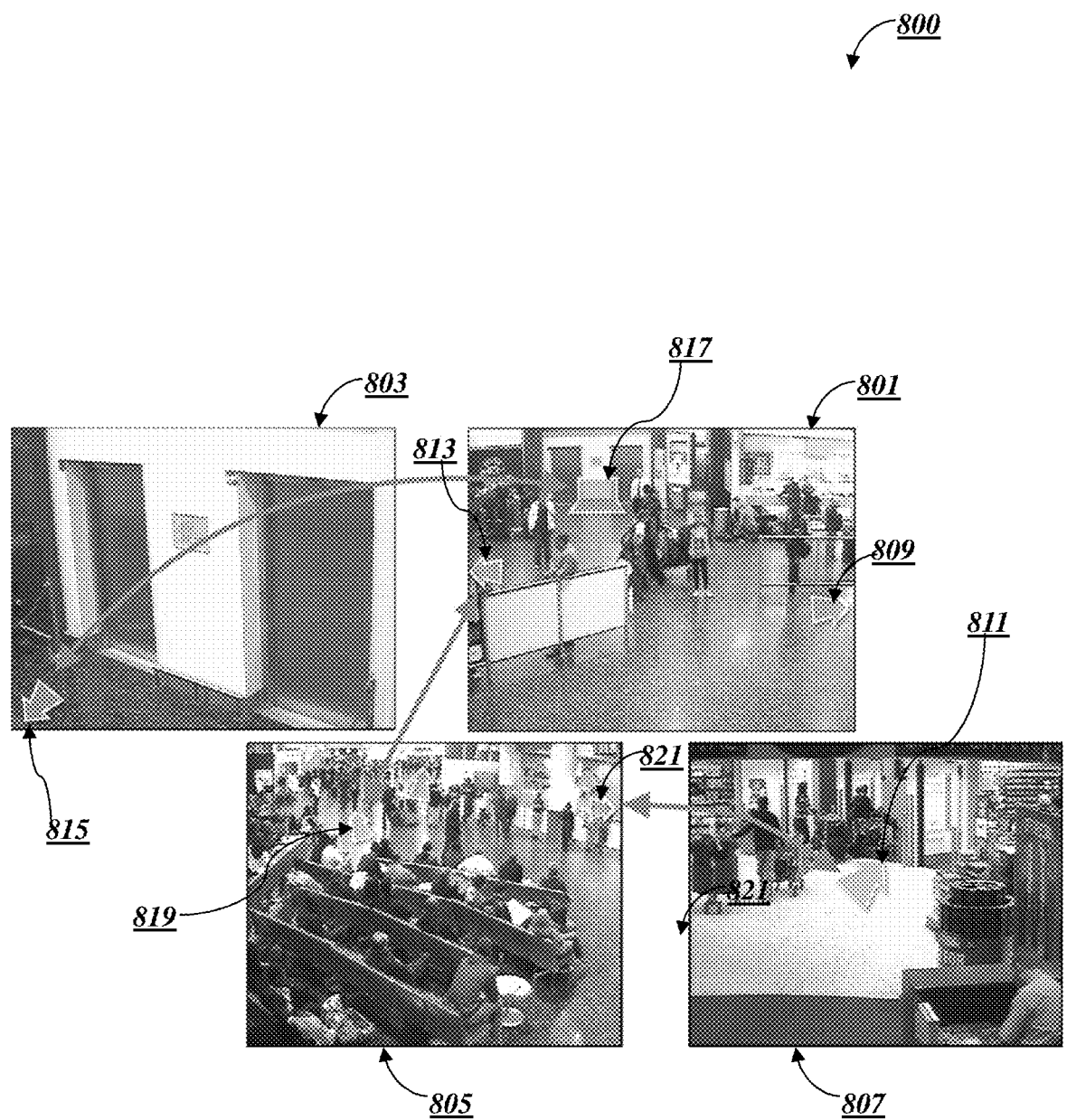
FIG. 8 depicts a screenshot of a plurality of fields of view corresponding to different cameras, and transition zone icons that can be activated by a user to transition between the pluralities of fields of view in accordance with exemplary embodiments of the present disclosure.

FIG. 8 depicts an illustration of example transition zones in accordance with exemplary embodiments of the present disclosure. Large-scale video surveillance systems provide methods for viewing multiple camera feeds simultaneously. However, tools that enable an operator to follow activity from one camera view to another are lacking, especially when camera fields-of-view do not overlap. A path reconstruction module 950 as disclosed herein addresses this need, by allowing human operators to annotate activity in video. As a result, an operator or the path reconstruction module 950 may seamlessly traverse between camera views (801, 803, 805, 807) using transition zones (809, 813, 815, 821, and 811) and reconstruct an evidential video by automatically combining snippets, derived from anchor points, from many cameras. Anchor points are discussed with respect to FIG. 14.

The path reconstruction module 950 incorporates several user interface capabilities that support human operators during multi-camera video investigations. Transition zones 809, 813, 815, 821, and 811, are clickable regions overlaid on the video, that direct a user to neighboring camera views, eliminating the need to pause the video to find a specific camera from a list or menu. While the path reconstruction module 950 is agnostic to object type (person, vehicle, bag), to facilitate explanation, the below discussion focuses on the task of following a person-of-interest across multiple cameras.

Transition zones define links between two camera views. In some embodiments, each zone is defined by its shape (coordinates of a polygon), the camera's unique identification number, and the zone (in another camera) to which it is linked. In some embodiments, each zone is defined by a subset of any of its shape (coordinates of a polygon), the camera's unique identification number, and the zone (in another camera) to which it is linked Transition zones are placed at each major entrance or exit area or both in the scene as depicted in FIG. 8. For indoor facilities, the shapes and placement often correspond with main foot traffic routes. For example, transition zone 811 can be placed near an exit where pedestrians exit a first area, thereby leaving the field of view of a first camera corresponding to camera view 807, and entering a second area, and thereby appearing in the field of view of a second camera corresponding to camera view 805, and transition zone 821. These transition zones can be linked together. Similarly transition zones 819 and 813 can be linked together as well. In some embodiments, transition zones can have different colors. For example, transition zone 819 can have a different color than transition zone 813. The color of transition zone 819 can indicate to an operator that the operator can click on transition zone 819 thereby enabling the operator to look at a camera view corresponding to an area from which an object came from. For instance, an operator can be looking at camera view 805, and wants to determine how an object of interest came into the camera view 805. The operator can click transition zone 819, which closes the stream corresponding to camera view 805, and opens a stream corresponding to camera view 801, which can be the previous camera view of the object. Accordingly, the operator can determine how the object appeared in camera view 805, after leaving camera view 801. In some embodiments, a transition zone icon that is green can indicate the next camera whose field of view the object will be in as it leaves the field of view of a previous camera and enters the field of view of the next camera. A transition zone icon that is yellow can indicate the exact opposite. That is a yellow transition zone icon can indicate the previous camera whose field of view the object was in prior to entering into the field of view of the camera that a user is currently viewing. Because the transition zone icons are color coordinated, this makes it easy for a user to quickly switch between cameras whose field of view the object might have entered into as the object moves across a certain area within the field of view of the cameras.

When a transition zone is clicked or selected, the path reconstruction tool closes the rendering of the current camera stream on a display, opens the linked camera stream and begins displaying the new camera view in the video player.

The transition zone corresponding to the previous camera is shown in a different color to give the user contextual information and provide a method for backtracking, if needed. The neighboring camera can be previewed by hovering over the transition zone; a static thumbnail of the camera view is shown in response. The thumbnail can be a tooltip that appears temporarily while the user's mouse hovers over the green arrow. It may then disappear when the user moves the mouse away from the green arrow In some embodiments, defining transition zones is a one-time, offline configuration step, the process of manually creating each transition zone can be time consuming. To reduce this burden, in some embodiments transition zones can be estimated algorithmically, using a pedestrian detection algorithm, and later confirmed or edited by the end user. In some embodiments, an Aggregated Channel Features (ACF) algorithm may be used to perform multi-resolution object detection. The input of the algorithm can be an image frame, and the output can be a bounding box, around the object, and confidence score for each detected object. The location and appearance information of the person can be tracked over time. In practice, a color matching algorithm is used to eliminate detections of other people who may be in the scene.

Once high-confidence detections of a single person are compiled, the entry and exit zones of each camera view are estimated based on the time and location of the person. In some embodiments, a high-confidence detection may be defined based on a statistical parameter such as a confidence interval. In some embodiments, the person exits one camera and reappears in the next camera after a few moments; transition zones linking the two cameras are placed at the location of the last/first sighting, respectively. Accordingly, the exit zone can be the last sighting of the person within the field of view of a first camera, and the entry zone can be the first sighting of the person within the field of view of a second camera. The transition zones can be placed at the location where the person disappears from the field of view of the first camera and reappears in the field of view of the second camera. Further, the transition zones can be linked together. In some embodiments, additional logic is used in the cases where camera density increases (causing the person to appear in multiple cameras at the same time) or significant gaps exist (person is missing from any view for long period of time).

In some embodiments, anchor points, or bookmarks, are marked by the operator as a person enters and exits a camera's field of view. The anchor point consists of a bounding box (upper left corner x, y coordinates, along with width and height), time in milliseconds since epoch (Jan. 1, 1970 UTC), and the camera's unique identification number.

In embodiments where a human operator marks anchor points as the person-of-interest enters and exits each camera view, the algorithm switches videos at a point in time that is halfway between the last anchor point in the current camera view and the first anchor point in the subsequent camera view. In some embodiments where anchor points from the closely spaced cameras may be intermixed over time, the path reconstruction module 950 alternates between camera views in order to show all sightings that were marked by the operator. In some embodiments, additional logic is executed for cases when two observations are separated by a large gap in time, or when resolution is not uniform across the camera views.

In some embodiments, the final reconstructed video can be exported to a video file in MPEG-4 or other standard compression format. In some embodiments, the originating camera name, date, and time may be superimposed under the video.

Computing the camera streams and time windows to be included in the composite video has negligible computation time. Any latency is often due to the overhead of communicating with the video management system (VMS) and acquiring new camera streams. Exporting the video to file can take a few minutes or longer depending on the length of the video, number of camera views, VMS communication overhead, and resolution of each camera.

The path reconstruction module 950 is useful for following the activity of a person-of-interest across multiple camera views and producing a composite video that illustrates the activity in a concise way. The composite video can be used for collaboration with other investigators. Additionally, the annotation metadata (camera identification numbers, timestamps) can be stored for later reference. In some embodiments, the path reconstruction module 950 is used for other tasks such as vehicle tracking.

Figure 9:
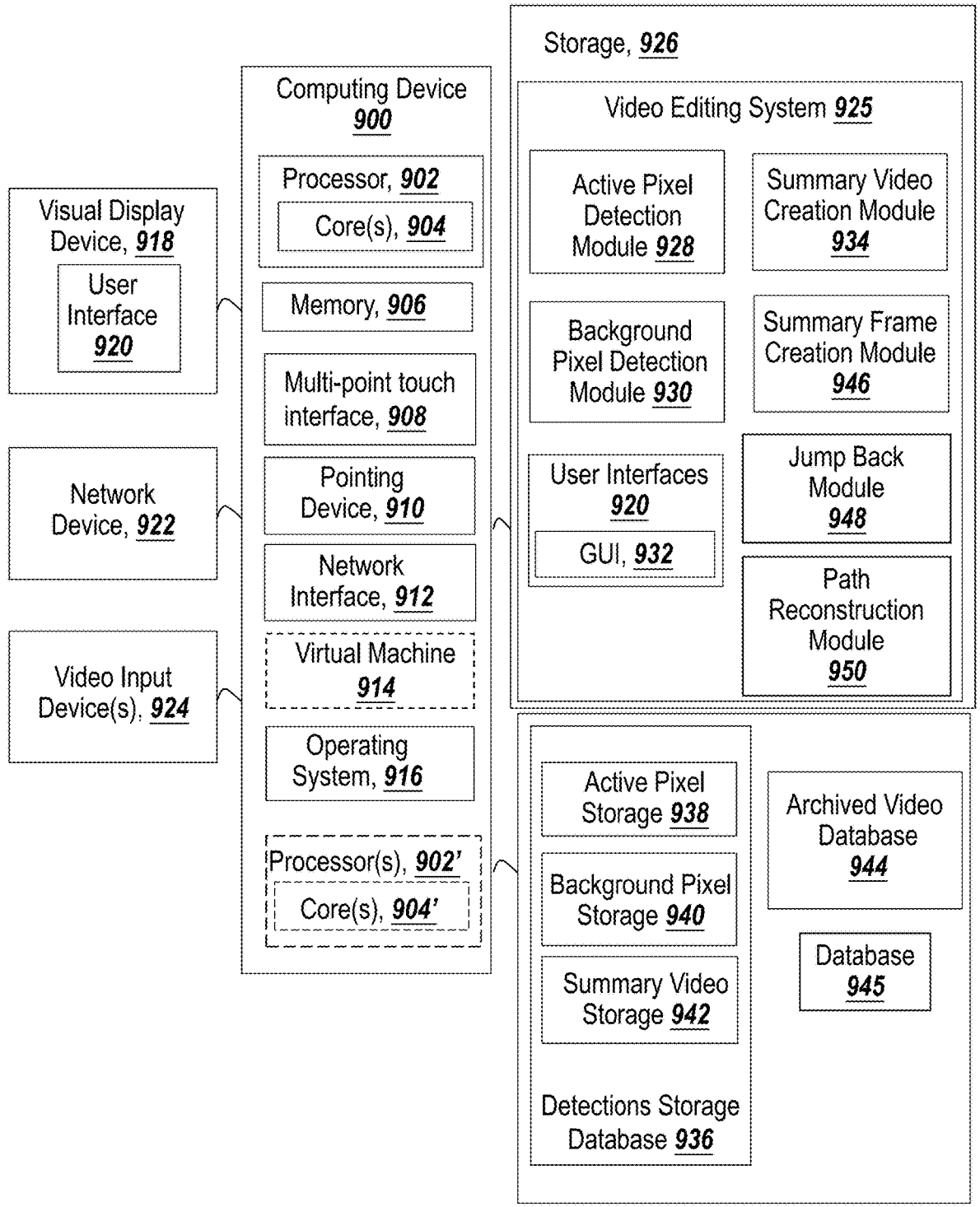
FIG. 9 is a block diagram of an exemplary computing system that can perform exemplary processes in accordance with exemplary embodiments of the present disclosure.

The exemplary tracking feature described above may be implemented by path reconstruction module 950 in FIG. 9.

Exemplary Computing Devices

FIG. 9 is a block diagram of an exemplary computing device 900 that can be used to perform any of the methods provided by exemplary embodiments. The computing device 900 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. Memory 906 can include a computer system memory or random access memory, such as DRAM, SRAM, EDO RAM, and the like. Memory 906 can include other types of memory as well, or combinations thereof. For example, memory 906 included in the computing device 900 can store computer-readable and computer-executable instructions or software for implementing exemplary embodiments taught herein. The computing device 900 also includes processor 902 and associated core 904, and may include one or more additional processor(s) 902' and associated core(s) 904' (for example, in the case of computer systems having multiple processors/cores), for executing computer-readable and computer-executable instructions or software stored in the memory 906 and other programs for controlling system hardware. Processor 902 and processor(s) 902' can each be a single core processor or multiple core (904 and 904') processor.

Virtualization can be employed in the computing device 900 so that infrastructure and resources in the computing device can be shared dynamically. A virtual machine 914 can be provided to handle a process running on multiple processors so that the process appears to be using only one computing resource rather than multiple computing resources. Multiple virtual machines can also be used with one processor.

A user can interact with the computing device 900 through a visual display device 918, such as a touch screen display or computer monitor, which can display one or more user interfaces 920 that can be provided in accordance with exemplary embodiments, for example, the exemplary interfaces illustrated in FIGS. 3, 4a-c, 5a-5b, 7, 8, 13, and 16. The visual display device 918 can also display other aspects, elements and/or information or data associated with exemplary embodiments, for example, views of databases, maps, tables, graphs, charts, and the like. The computing device 900 can include other I/O devices for receiving input from a user, for example, a keyboard or any suitable multi-point touch interface 908, and/or a pointing device 910 (e.g., a pen, stylus, mouse, or trackpad). The keyboard and/or the pointing device 910 can be electrically coupled to the visual display device 918. The computing device 900 can include other suitable I/O peripherals.

The computing device 900 can include a network interface 912 configured to interface via one or more network devices 922 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 912 can include a built-in network adapter, network interface card, PCMCIA network card, card bus network adapter, wireless network adapter, USB network adapter, modem or any other device suitable for interfacing the computing device 900 to any type of network capable of communication and performing the operations described herein. Moreover, the computing device 900 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 900 can run any operating system 916, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 916 can be run in native mode or emulated mode. In an exemplary embodiment, the operating system 916 can be run on one or more cloud machine instances. The computing device 900 may include one or more video input devices 924, such as one or more video cameras that may be used by a user to provide one or more video input streams.

The computing device 900 can also include one or more storage devices 926, such as a hard-drive, CD-ROM, or other computer readable media, for storing data and computer-readable instructions and/or software that implement exemplary embodiments as taught herein or portions thereof. Storage 926 includes a video editing system 925. Video editing system 925 includes an active pixel detection module 928, background pixel detection module 930, user interfaces 920, summary video creation module 934, and/or the summary frame creation module 946, in exemplary embodiments. The user interfaces 920 can include a GUI 932 that can be rendered by the visual display device 918. GUI 932 can be a GUI corresponding to one or more of the exemplary interfaces illustrated in FIGS. 3, 4a-c, 5a-5b, 7, 8, 13, and 16. In other words, GUI 932 can be a GUI that implements and/or displays GUIs 300, 400, 500, 700, 800, 1300, and 1600.

In exemplary embodiments, the active pixel detection module 928 can detect active pixels within each source frame by comparing each pixel value with the corresponding pixel within the background image. As discussed above, a motion sensitivity threshold value may be used to determine which pixels are active versus which pixels are merely part of the background image. The pixels of the background image, as well as the adaptive background model that characterizes the background over a temporally local span of source video, can be generated using the background pixel detection module 930.

In exemplary embodiments, the summary frame creation module 946 creates the frames of a summary video by overlaying the active pixels over the background image; and the summary video creation module 934 creates the summary video by aggregating the summary frames in the proper order to create a summary video. As discussed above, the number of frames included in a summary video can be determined based on a compression ratio, which can be dynamically adjusted by a user via the GUI 932, in some embodiments. These modules may be logically or physically separate, or combined into one or more modules.

An exemplary database 945 can store one or more additional databases, such as the detections storage database 936 or the archived video database 944, for storing any suitable information required to implement exemplary embodiments. The archived video database 944 may store, for example, the original source video and/or video data relating to previously created summary videos. The video management system may store video frames in archived video database 944 for retrieval by summary video creation module 934, summary frame creation module 946, or path reconstruction module 950. Path reconstruction module 950 may execute computer executable instructions that cause the module to retrieve frames from the archived video database 944 and combine, or concatenate, the retrieved frames to create a composite video.

In exemplary embodiments, the detections storage database 936 may include active pixel storage 938 for storing information regarding active pixels within the source video, background pixel storage 940 for storing information regarding the pixels that make up the background image, and/or a summary video storage 942 for storing the summary video once it is created. Jump back module 948 can use data stored in active pixel storage 938 and background pixel storage 940 in determining whether to continue jumping back in time as described above with reference to algorithm 1 and algorithm 2. Jump back module 948 can include computer executable instructions that cause the module to perform the operations in algorithm 1 and algorithm 2 using the data stored in active pixel storage 938, and background pixel storage 940. The database 945 may be provided on the computing device 900 or provided separately or remotely from the computing device 900.

Exemplary Network Environments

Figure 10:
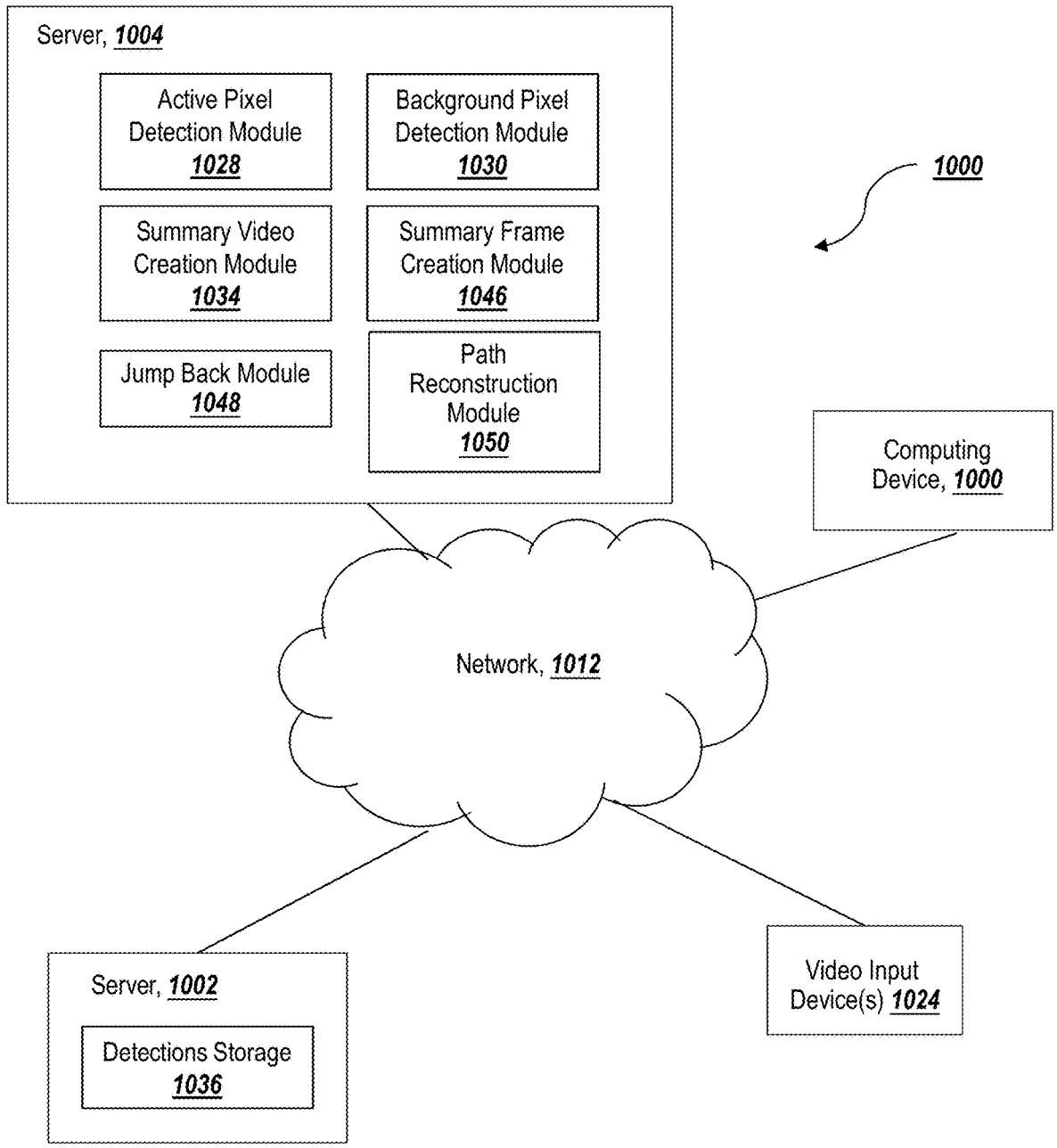
FIG. 10 is a diagram of an exemplary network environment suitable for a distributed implementation of exemplary embodiments of the present disclosure.

FIG. 10 is a diagram of an exemplary network environment 1000 suitable for a distributed implementation of exemplary embodiments. The network environment 1000 can include one or more servers 1002 and 1004 that can include the active pixel detection module 1028, the background pixel detection module 1030, the summary frame creation module 1046, the summary video creation module 1034, jump back module 1048, path reconstruction module 1050, the detections storage 1036, or other elements described in reference to FIG. 10. In exemplary embodiments, the server 1004 can include the active pixel detection module 1028, the background pixel detection module 1030, the summary frame creation module 1046, the summary video creation module 1034, jump back module 1048, path reconstruction module 1050; while the server 1002 includes the detections storage 1036. As will be appreciated, various distributed or centralized configurations may be implemented, and in some embodiments a single server can be used. The network environment can also include computing device 1000 and video input device(s) 1024, and/or other elements described in reference to FIG. 10.

In exemplary embodiments, the servers 1002 and 1004, computing device 1000, and video input device(s) 1024 may be in communication with each other via a communication network 1012. The communication network 1012 may include, but is not limited to, the Internet, an intranet, a LAN (Local Area Network), a WAN (Wide Area Network), a MAN (Metropolitan Area Network), a wireless network, an optical network, and the like. In exemplary embodiments, in response to user input commands at the computing device 1000, a user can dynamically configure the summary video parameters, such as the motion sensitivity threshold value and/or the summary video compression ratio. Once a summary video is created at the summary video creation module 1034, the summary video may be transmitted to the computing device 1000 and displayed to a user via a GUI. Jump back module 1048 includes executable code and other code to implement algorithm 1 and algorithm 2 described above. Path reconstruction module 1050 includes executable code and other code to implement one or more of the tracking features as described with reference to FIG. 8 above.

Figure 11:
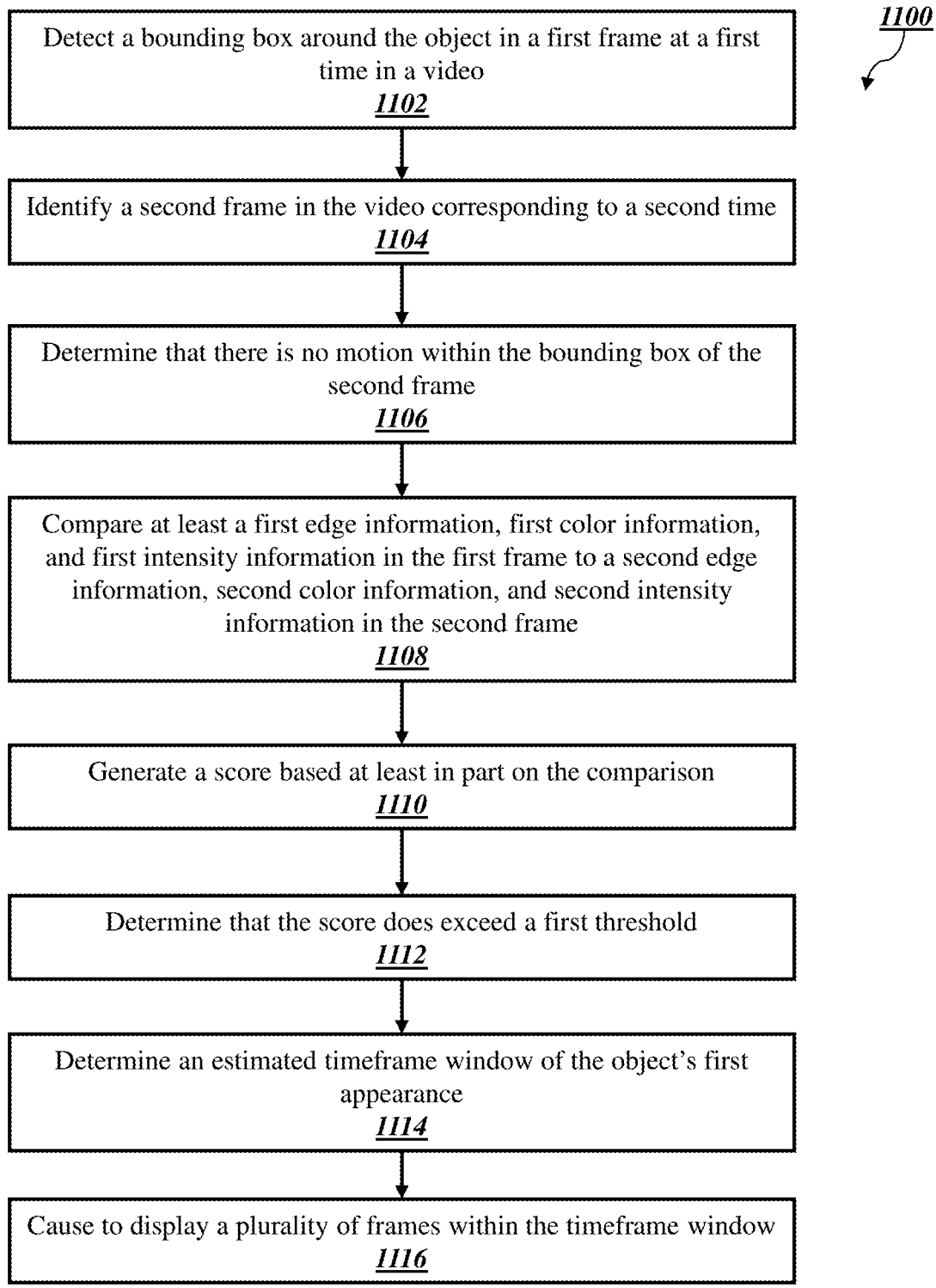
FIG. 11 is a flowchart illustrating an exemplary method for reviewing when an object was placed in a field of view of a camera, according to embodiments of the present disclosure.

FIG. 11 is a flowchart illustrating an exemplary method for reviewing video footage when an object was placed in a field of view of a camera, according to embodiments of the present disclosure. At block 1102, one or more instructions in jump back module 948 may be executed by a processor to detect a bounding box around a portion or all of the object in a first frame at a first time in the video. For example, the processor can detect a bounding box, similar to bounding box 607 in FIG. 6, around object 605 in chip 609, in response to executing the instructions in jump back module 948. As noted above, chip 609 may also be referred to a cue reference frame.

At block 1104, the processor may identify a second frame in the video corresponding to a second time. Returning to FIG. 6, the processor can seek through one or more chips that have occurred in the past, (also referred to as jumping back in time), and identify a frame, or chip 615, at a time prior to chip 609. Chip 615 may also be referred to as a test frame. Chip 615 may be referred to a test frame, because chip 615 is the frame that the jump back module 948 compares, or tests, against the cue reference frame. At block 1106, the processor may determine that there is no motion within the bounding box of the second frame. For instance, the processor may execute one or more instructions, in the jump back module 948, that cause the processor to perform an operation of evaluating motion within bounding box 615.

At block 1108, the processor may compare at least a first edge information, first color information, and first intensity information in the first frame to a second edge information, second color information, and second intensity information in the second frame. For instance, the processor can further execute instructions in jump back module 948, causing the processor to compare intensity and color information 617 corresponding to chip 609 to intensity and color information (not shown) corresponding with chip 615. The processor can also perform the operation of comparing edge information 619 corresponding to chip 609 to edge information corresponding to chip 615.

At block 1110, the processor may generate a score based at least in part on the comparison of at least the first edge information to the second edge information, at least the first color information to the second color information, or at least the first intensity information to the second intensity information. At block 1112, the processor may determine that the score does exceed a first threshold. The threshold can be user defined in some embodiments. In other embodiments, the threshold can be determined based at least in part on the jump back module 948.

At block 1114, the processor may determine an estimated timeframe window of the object's first appearance. For instance the processor may execute one or more instructions associated with the jump back module 948 that cause the processor to estimate a timeframe window during which the object first appeared. More specifically, the processor can perform operations associated with algorithm 2, described above, that refines, or narrows, the timeframe window around which the object first appeared. The processor can perform these operations until the difference in time between when the object is first seen and the object is first determined not to be present, is less than an allowable time window. The allowable time window can be a user defined amount of time (e.g., 10 seconds). In other embodiments, the allowable time window can be less than 10 seconds, and can ultimately be determined based on the setting in which the jump back module 948 is being used, and/or the motion activity in a scene.

At block 1116, the processor may cause to display a plurality of frames within the timeframe window on a display connected to the at least one processor. The at least one processor may execute instructions that cause visual display device 918 to display a plurality of frames falling inside the estimated timeframe window.

Figure 12:
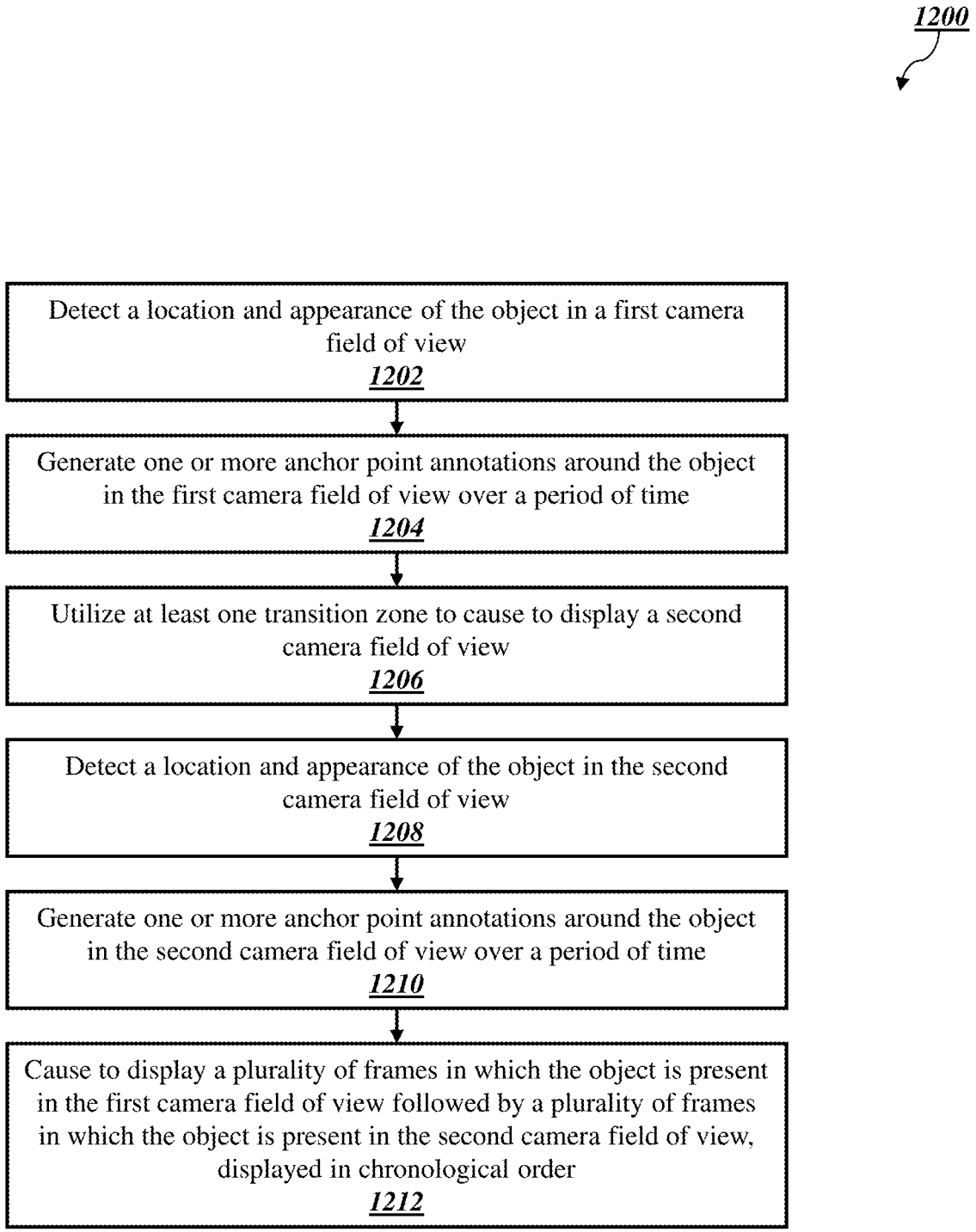
FIG. 12 is a flowchart illustrating an exemplary method for tracking an object or an individual across a plurality of cameras, according to embodiments of the present disclosure.

FIG. 12 is a flowchart illustrating an exemplary method for tracking an object across a plurality of cameras, according to embodiments of the present disclosure. At block 1202, a processor may detect a location and appearance of the object in a first camera field of view. The processor may execute one or more instructions associated with the path reconstruction module 950, to detect the location and appearance of the object. For example, the processor can detect object 709 in FIG. 7 by executing the one or more instructions in path reconstruction module 950.

At block 1204, the processor can generate one or more anchor point annotations around the object in the first camera's field of view over a period of time. The processor can execute one or more instructions associated with the path reconstruction module 950 that cause the processor to generate the one or more anchor points. For example, the one or more instructions may cause the processor to activate GUI 932 thereby displaying one or more anchor points (e.g., anchor points 729).

At block 1206, the processor can utilize at least one transition zone to cause to display a second camera's field of view. The processor can execute one or more instructions associated with path reconstruction module 950, thereby causing the processor to send a signal to the second camera, which may be one of video input devices 924, to display the field of view of the second camera.

At block 1208, the processor can detect a location and appearance of the object in the second camera's field of view. The processor detects the location and appearance of the object based at least in part on a user input to generate a bounding box around the object. When a bounding box is created around the object, a time stamp, and camera identifier (ID) may be stored as an anchor point. The processor can execute one or more instructions associated with path reconstruction module 950, that cause the processor to determine the location of the object relative to a spatial reference system and the appearance of the object.

At block 1210, the processor can generate one or more anchor point annotations around the object in the second camera's field of view over a period time. The processor can execute one or more instructions associated with the path reconstruction module 950 that cause the processor to generate the one or more anchor points. For example, the one or more instructions may cause the processor to activate GUI 932 thereby displaying one or more other anchor points, that are different form the anchor points 729.

At block 1212 the processor can cause to display a plurality of frames in which the object is present in the first camera's field of view followed by a plurality of frames in which the object is present in the second camera's field of view, displayed in chronological. The processor can execute one or more instructions associated with the path reconstruction module 950, that cause the processor to generate the plurality of frames. For example, with reference to FIG. 14, the leftmost anchor point of anchor points 1408 corresponds to a first frame, in the chronological order of the plurality of frames. The first frame can be a frame generated by the first camera, and can be a frame associated with the first camera's field of view. The right most anchor point of anchor points 1408 corresponds to a last frame, in the chronological order of the plurality of frames. The second frame can be a frame generated by the second camera, and can be a frame associated with the second camera's field of view.

Figure 13:
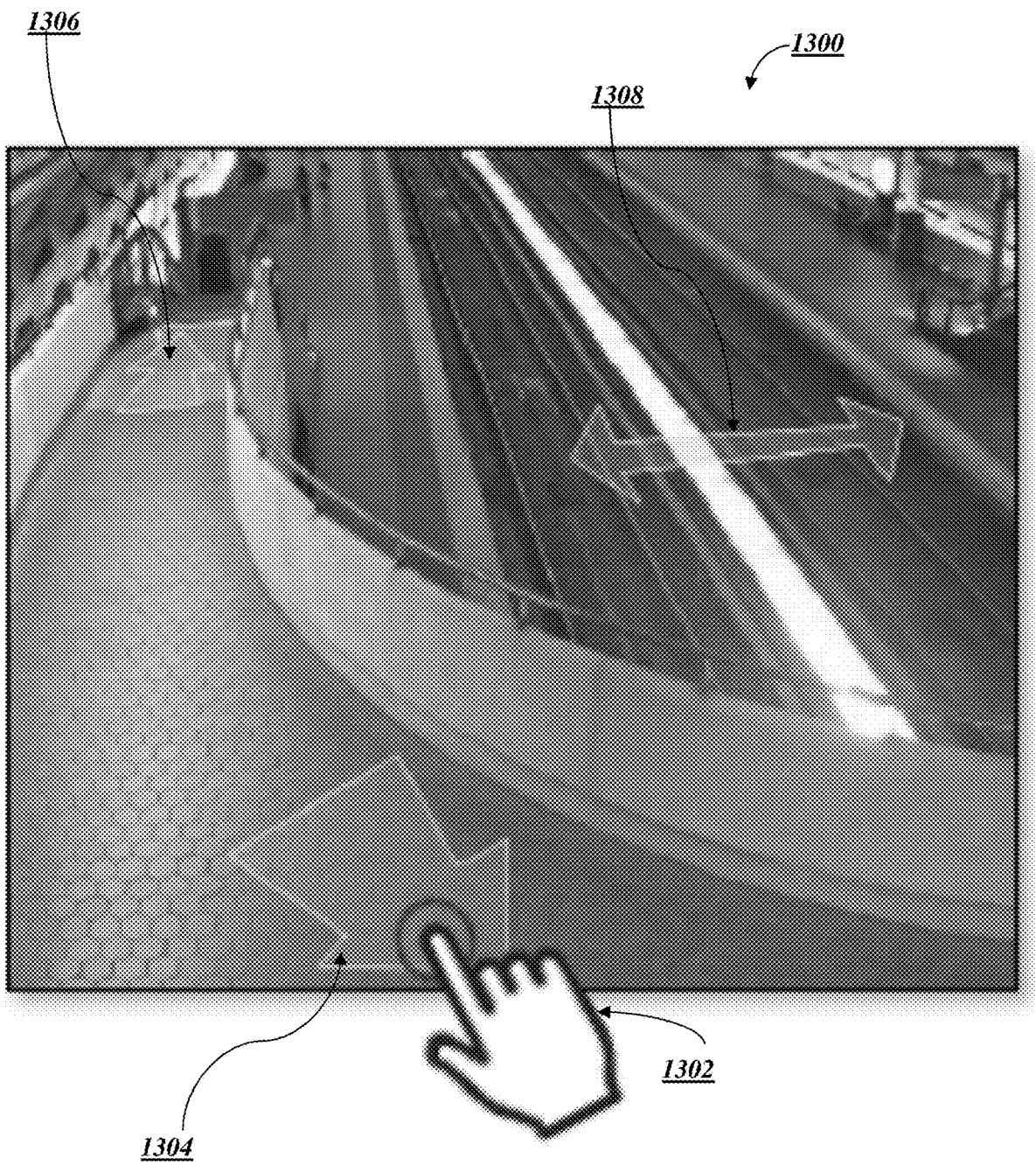
FIG. 13 depicts a screen shot of a graphical user interface for navigating a camera network, according to embodiments of the present invention.

FIG. 13 depicts a screenshot of an overlay graphical user interface 1300 for navigating a camera network, according to embodiments of the present invention. FIG. 13 depicts a field of view of a first camera with an overlay graphical user interface including transition zone icons 1304, 1306, and 1308. Transition zone icon 1308 (double arrow) can switch to a view that is identical, but a mirror image to that of which the user is viewing. In FIG. 13, this would correspond to the user viewing the same area from another camera located on the other side of the train tracks. The overlay graphical user interface can be used to navigate from the field of view of the first camera to a field of view of a second camera (not shown). The overlay graphical user interface may include one or more transition zone icons 1304 and 1306. In some embodiments, the transition zone icons 1304 and 1306 can be in the shape of arrows. In other embodiments, the transition zone icons 1304 and 1306 can be in the shape of squares or rectangles. A user can interact with the transition zone icons using a cursor 1302 to select a transition zone icon. When a user selects a transition zone icon, the overlay graphical user interface displays the field of view of the other camera associated with the transition zone icon.

Figure 14:
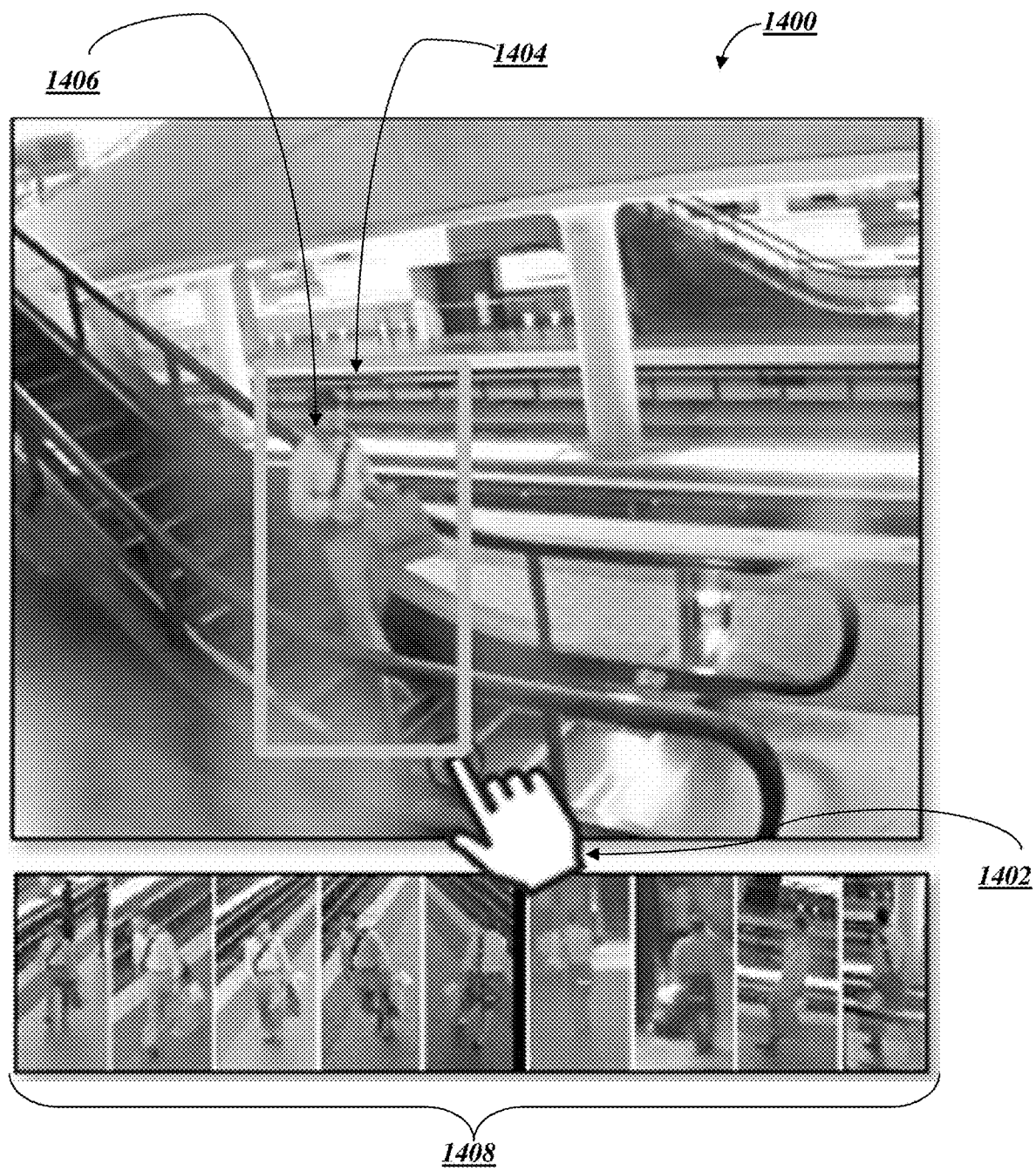
FIG. 14 depicts a screen shot of a graphical user interface for selecting an object when in the field of view of a plurality of cameras, and generating anchor points, according to embodiments of the present disclosure.

FIG. 14 depicts a screen shot of a graphical user interface 1400 for selecting an object of interest when in the field of view of a plurality of cameras, and generating anchor points, according to embodiments of the present disclosure. FIG. 14 depicts an individual of interest 1406 in a field of view of a camera. The graphical user interface can generate a bounding box 1404 around the individual of interest 1406 in response to an input from a user via a cursor 1402. The graphical user interface can also display a plurality of anchor points 1408. Anchor points 1408 can be specified by the user to identify the individual of interest or object in the field of view of other video cameras. In some embodiments, this may enable the user to quickly review, or scrub, video footage backward and forward in time if they lose track of the object of interest as they, or it, transition from the field of view of one camera to the field of view of another camera. In some embodiments, anchor points are generated by path reconstruction module 950, and can be used to reconstruct a composite video showing each observation stitched together over time.

In some embodiments, the algorithm for reconstructing a composite video uses the time of each anchor point to determine what portion of video to include, and when to switch between cameras. At least two anchor points are required before the video can be constructed, and the beginning and end times of the video correspond to the earliest and latest anchor points, respectively.

Figure 15:
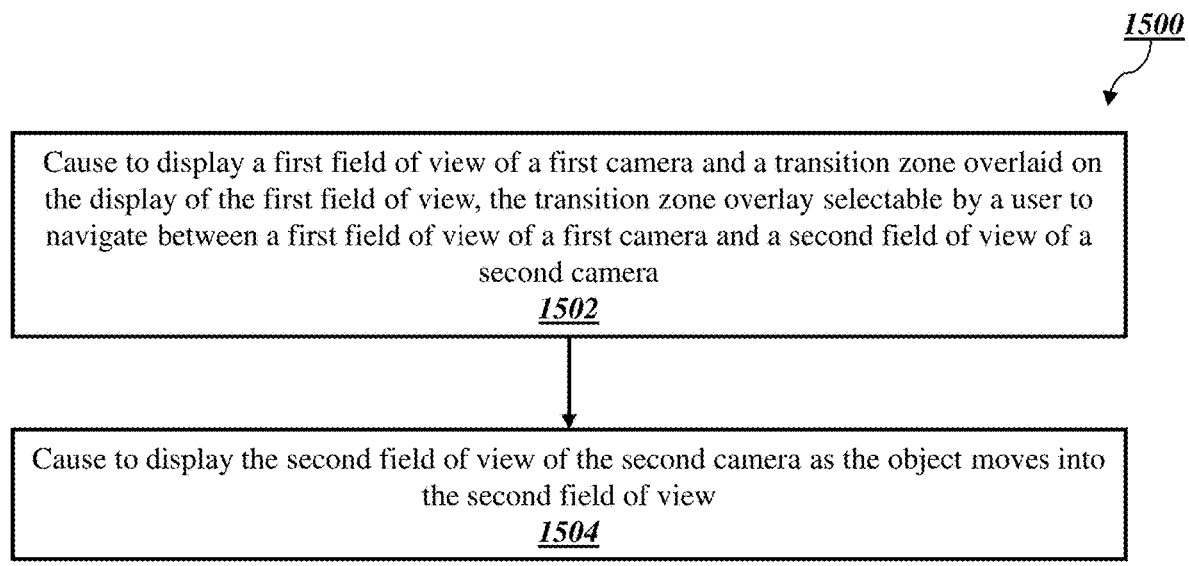
FIG. 15 is a flowchart illustrating an exemplary method for navigating a camera network using a graphical user interface, according to embodiments of the present disclosure.

FIG. 15 is a flowchart illustrating an exemplary method for navigating a camera network using an overlay graphical user interface, according to embodiments of the present disclosure. In one embodiment the overlay graphical user interface 1300 can be displayed on a display of the computing device 900 in which a peripheral (e.g., mouse or keyboard) is used to interact with the overlay graphical user interface. In other embodiments, the overlay graphical user interface can be displayed on a touch screen. At block 1502, process 1500 can cause to display a first field of view of a first camera and a transition zone overlaid on the display of the first field, such as the overlay graphical user interface 1300, where the transition zone overlay is selectable by a user to navigate between a first field of view of a first camera and a second field of view of a second camera. For example, cursor 1302 in FIG. 1300 can be used by a user to select either of transition zone icons 1304 or 1306 thereby causing the screen to switch from displaying the field of view of a first camera to a field of view of a second camera. For instance, a user can navigate cursor 1302 to transition zone icon 1304 and can activate transition zone icon 1304 thereby causing the processor to execute instructions to display the second field of view of the second camera as the object comes in to the second field of view (block 1504). For example, when an operator activates transition zone icon 1304 by clicking it via cursor 1302, the screen switches from displaying the field of view of a first camera (e.g., as shown in FIG. 13) to the field of view of a second camera (e.g., as shown in FIG. 14).

Figure 16:
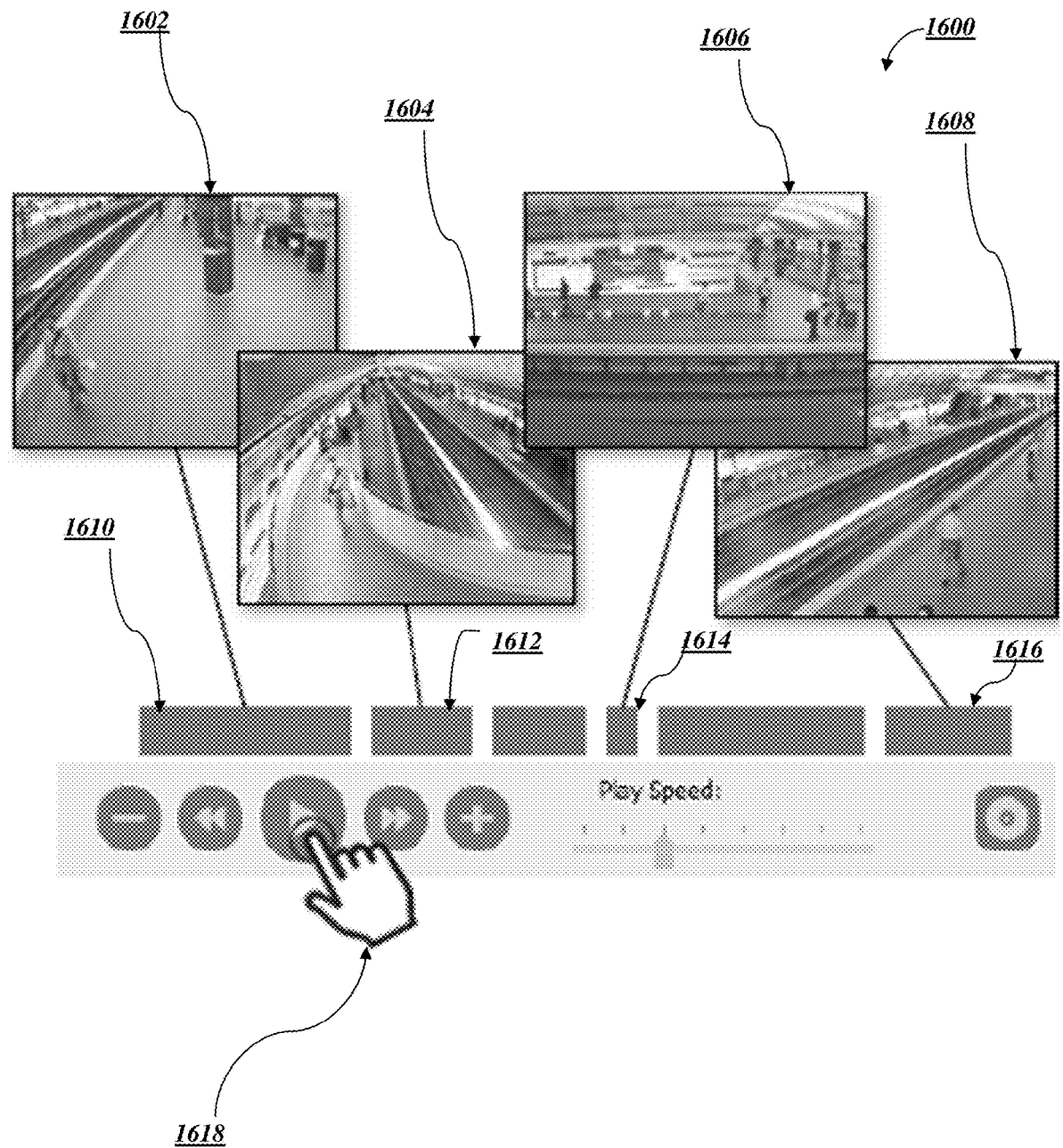
FIG. 16 depicts a screen shot of a graphical user interface for reviewing composite video footage of an object across the fields of view of a plurality of cameras, according to embodiments of the present disclosure.

FIG. 16 depicts a screen shot of a graphical user interface 1600 for reviewing composite video footage of an object across a plurality of cameras, according to embodiments of the present disclosure. The composite video footage can be generated in response to a processor executing one or more instructions associated with path reconstruction module 950. Cursor 1618 can be used to play the composite video footage, rewind the composite video footage, fast forward the composite video footage, increase or decrease the speed of playback of the composite video footage using a plus and minus sign respectively. The speed of playback can also be changed using a slider bar. Video segments 1610, 1612, 1614, and 1616 correspond to portions of the composite video footage in which an object of interest is in the field of view of one or more cameras. Images 1602, 1604, 1606, and 1608 are frames from the composite video of footage in which the object of interest is within the field of view of a camera recording footage during segments 1610, 1612, 1614, and 1616 respectively.

Figure 17:
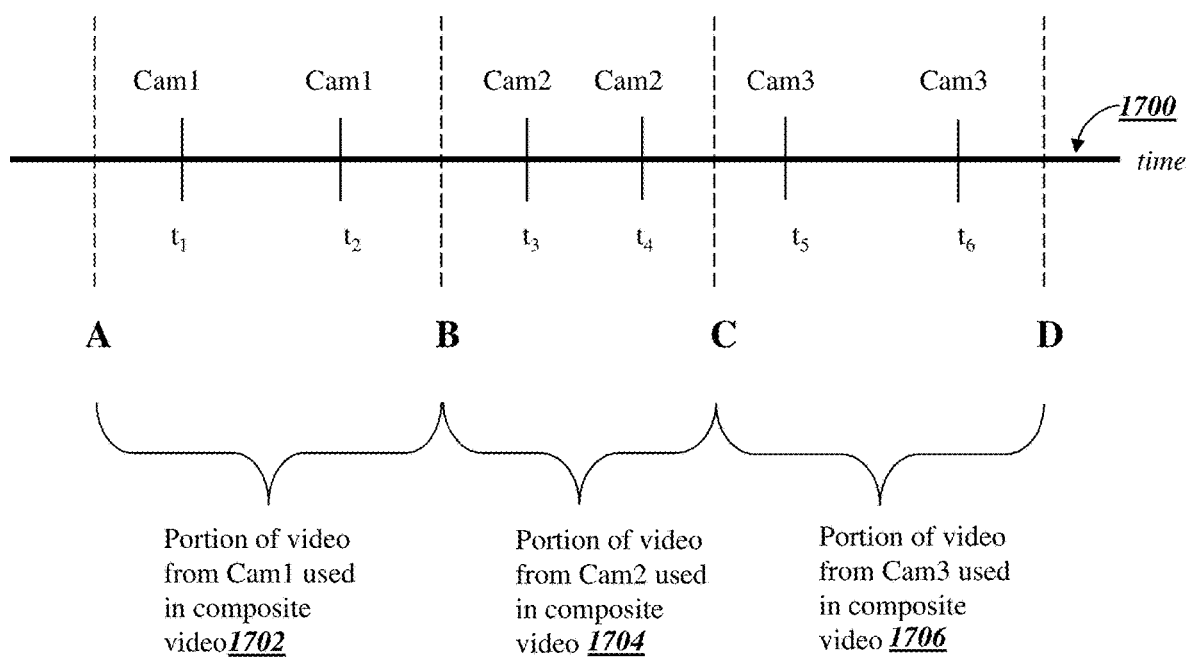
FIG. 17 depicts a timeline corresponding to segments of a composite video comprising where each segment is a portion of a video stream from a different camera, according to embodiments of the present disclosure.

FIG. 17 depicts a timeline 1700 corresponding to segments of a composite video where each segment is a portion of a video stream from a different camera, according to embodiments of the present disclosure. Path reconstruction module 950 can include instructions which when executed by a processor can cause the processor to combine one or more segments of video stream each of which is produced by a corresponding camera. Portion 1702 can be a segment generated by a first camera (Cam1), portion 1704 can be a segment produced by a second camera (Cam2), and portion 1706 can be a segment produced by a third camera (Cam3). The times $t_1$ and $t_2$, correspond to the times of the earliest and latest anchor points that were generated by Cam1. The times $t_3$ and $t_4$, correspond to the times of the earliest and latest anchor points that were generated by Cam2 The times $t_5$ and $t_6$, correspond to the times of the earliest and latest anchor points that were generated by Cam3.

The time corresponding to boundaries A and B are the beginning and the end of the segment for Cam1. Path reconstruction module 950 can include instructions that cause the processor to determine the portion of video from Cam1 that should be used in the composite video. The time corresponding to boundaries B and C are the beginning and the end of the segment for Cam2 Path reconstruction module 950 can include instructions that cause the processor to determine the portion of video from Cam2 that should be used in the composite video. The time corresponding to boundaries C and D are the beginning and the end of the segment for Cam3. Path reconstruction module 950 can include instructions that cause the processor to determine the portion of video from Cam3 that should be used in the composite video. In some embodiments, boundary B is computed by finding the midpoint between $t_2$ and $t_3$. Likewise, the midpoint between $t_4$ and $t_6$ is equal to boundary time C. The boundaries A and D are usually equal $t_1$ and $t_6$, respectively. The boundaries are sometimes extended or capped to be no more than 30 seconds before/after an anchor point, if there is a large gap between times.

Figure 18:
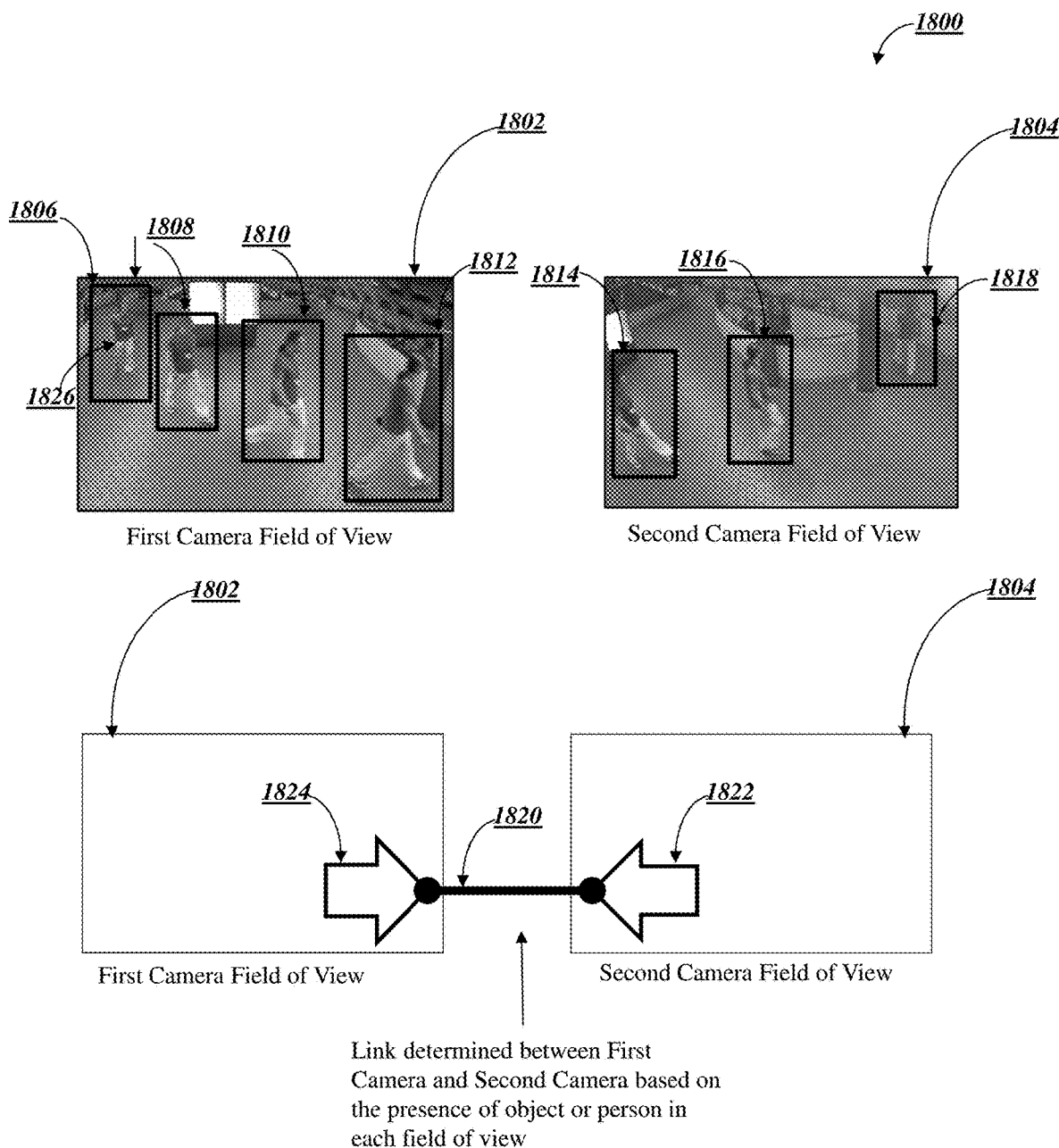
FIG. 18 depicts a screenshot of a path reconstruction tool detecting an object moving across the field of view of two cameras and a logical diagram indicating the placement of transition zone icons linking the two cameras, according to embodiments of the present disclosure.

FIG. 18 depicts a screenshot of a path reconstruction tool detecting an object moving across the field of view of two cameras and a logical diagram indicating the placement of transition zone icons linking the two cameras, according to embodiments of the present disclosure. Exemplary path reconstruction tool 1800 can include the field of view 1802 of a first camera and the field of view 1804 of a second camera. Path reconstruction module 950 can include instructions that cause a processor to detect a person 1826 at some point in time when object 1826 enters field of view 1802. In some embodiments, person 1826 can be an object. The processor can detect person 1826 and include a bounding box 1806 around person 1826. The processor can keep the same bounding box (represented by 1808, 1810, and 1812) around person 1826 as they move throughout area associated with field of view 1802. 1808, 1810, and 1812 can represent the same bounding box that moves along with person 1826 as person 1826 traverses the area associated with field of view 1802.

When person 1826 leaves field of view 1802 and enters field of view 1804, the processor can detect when person 1826 enters field of view 1804 and can add a bounding box 1814 corresponding to when the processor first detects person 1826 in field of view 1804. The same bounding box (represented by 1816 and 1818) can be around person 1826 as they move throughout the area associated with field of view 1804.

A user, or instructions in path reconstruction module 950, can cause the processor to place transition zone icons 1824 and 1822 at the rightmost edge of field of view 1802 and leftmost edge of field of view 1804. Transition zone icons 1824 and 1822 can be in the shape of arrows and in some embodiments can take other shapes. The user can click on transition zone icon 1824 and a video stream associated with the camera and field of view 1802 will end and a video stream associated with the camera and field of view of 1804 will begin. In some embodiments, transition zone icon 1824 can be green in color. The user can also click on transition zone icon 1822 and a video stream associated with the camera and field of view 1804 will end and a video stream associated with the camera and field of view of 1802 will begin. In some embodiments, transition zone icon 1824 can be yellow in color. A link 1820 can be established between a camera corresponding to transition zone icon 1824 and a camera corresponding to transition zone icon 1822. Link 1820 can be determined between the two cameras based on the presence of person 1826 or an object that enters or leaves field of view 1802 or 1804.

Figure 19:
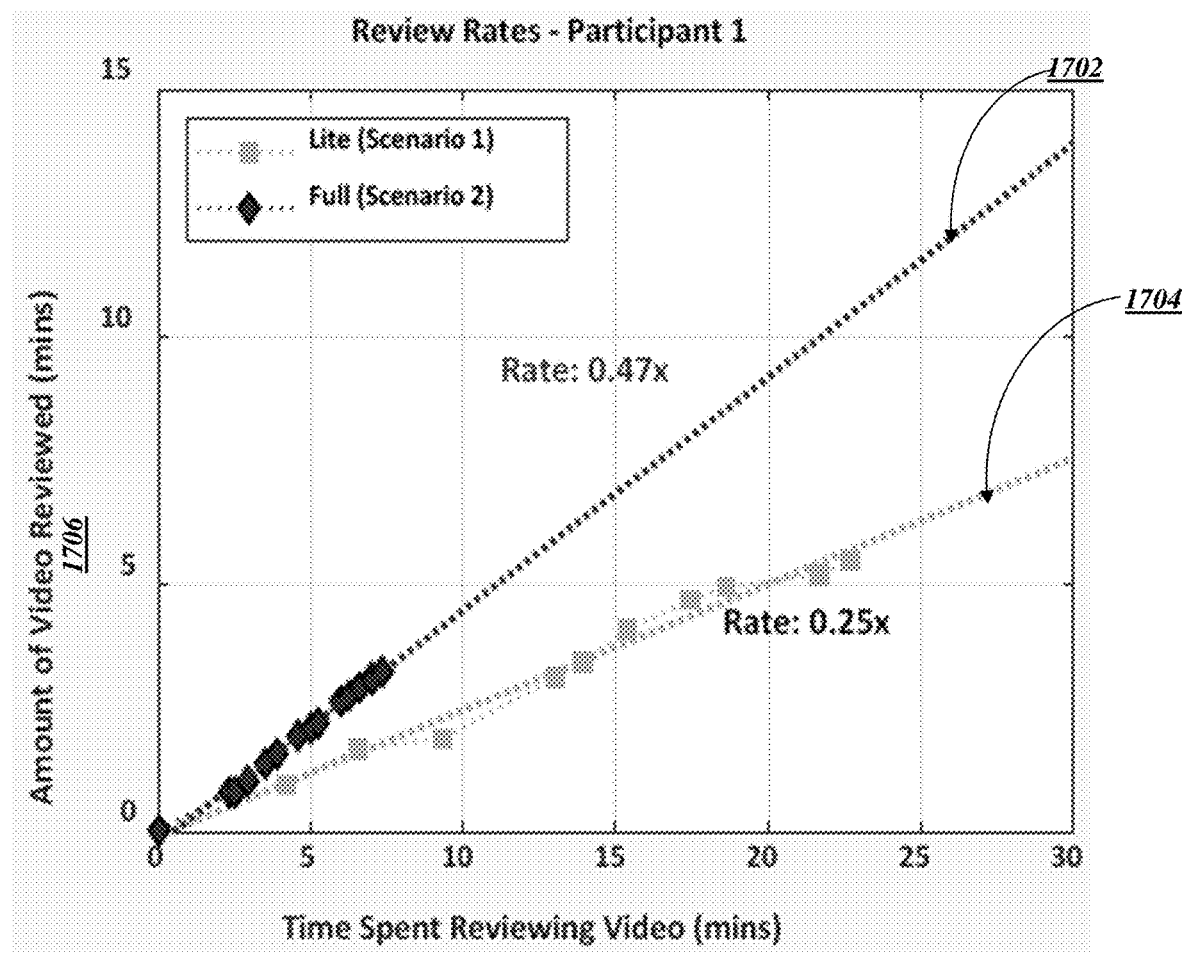
FIG. 19 includes a first graph depicting the amount of video footage that is reviewed by a reviewer, using a lite version of a video forensic tool, over a period of time, and second graph depicting the amount of video footage that is reviewed by a user, when using a full version of the video forensic tool in accordance with embodiments of the current disclosure.

FIG. 19 depicts a graphical representation of experimental results of the amount of video footage reviewed over a period of time for a first participant. FIG. 19 is a graph comparing the amount of video footage (amount of video reviewed (mins) 1906)) a user reviews in a given period of time (time spent reviewing video (mins) 1908) when tracking an object. Curve 1904 is a best fit line of the amount of video footage reviewed vs the amount of time it takes a user to review the amount of video footage, when the user just uses a video player to locate an object of interest. The amount of video footage reviewed vs the amount of time it takes a user to review the amount of video footage is expressed as a ratio of the former relative to the latter. The rate (ratio of the amount of video footage reviewed vs the amount of time it takes a user to review the amount of video footage) for curve 1904 is 0.25. This means that for every minute of video footage there is to be viewed, it took the user approximately four minutes to review the video footage. For example, it takes the user twenty minutes to review four minutes of video footage.

When the same user uses the transition zones and anchor point features, provided by path reconstruction module 950, the amount of video footage reviewed vs the amount of time it takes a user to review the amount of video footage for curve 1906 is 0.47. This means that for every minute of video footage there is to be viewed, it took the user slightly more than two minutes to review the same video footage. For example, it takes the user 20 minutes to review nine minutes of the same video footage that they viewed without the anchor points and transition zones.

Figure 20:
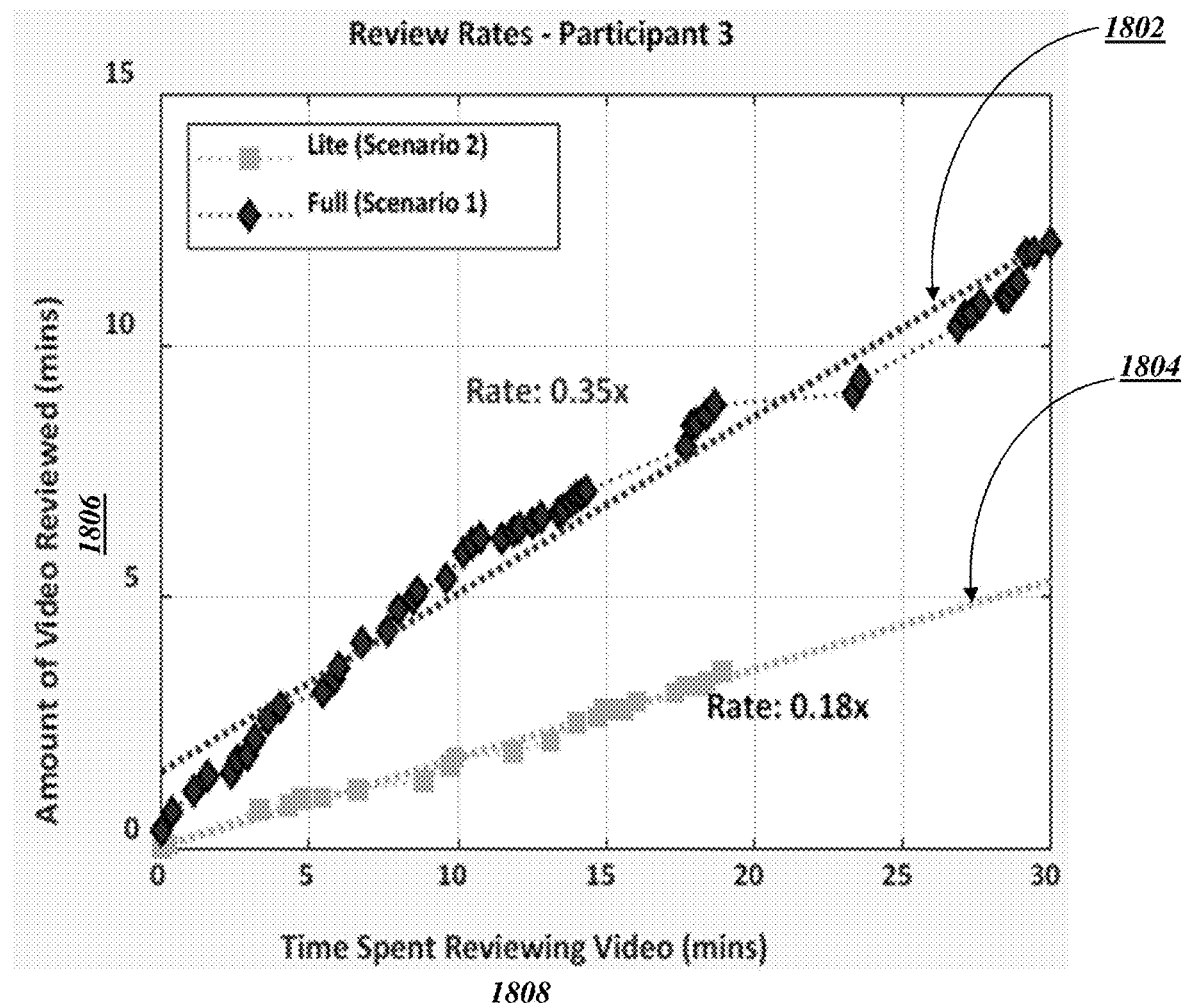
FIG. 20 includes a first graph depicting the amount of video footage that is reviewed by a reviewer, using a lite version of a video forensic tool, over a period of time, and second graph depicting the amount of video footage that is reviewed by a user, when using a full version of the video forensic tool in accordance with embodiments of the current disclosure.

FIG. 20 depicts a graphical representation of experimental results of the amount of video footage reviewed over a period of time of another participant. FIG. 20 is a graph comparing the amount of video footage (amount of video reviewed (mins) 2006)) that another user reviews in a given period of time (time spent reviewing video (mins) 2008) to track an object. Curve 2004 is a best fit line of the amount of video footage reviewed vs the amount of time it takes a user to review the amount of video footage, when the user is just using a video player to track an object of interest detection. The amount of video footage reviewed vs the amount of time it takes a user to review the amount of video footage is expressed as a ratio of the former relative to the latter. The rate (ratio of the amount of video footage reviewed vs the amount of time it takes a user to review the amount of video footage) for curve 2004 is 0.18. This means that for every minute of video footage there is to be viewed it took the user approximately five minutes to review the video footage. For example, it takes the user twenty minutes to review four minutes of video footage.

When the same user uses transition zones and anchor point features, provided by path reconstruction module 950, however, the users rate increases to 0.35. The rate (ratio of the amount of video footage reviewed vs the amount of time it takes a user to review the amount of video footage) for curve 2002 is 0.35. This means that for every minute of video footage there is to be viewed it took the user approximately two minutes to review the same video footage. For example, it takes the user ten minutes to review five minutes of the same video footage that they viewed without the anchor points and transition zones.

Figure 21:
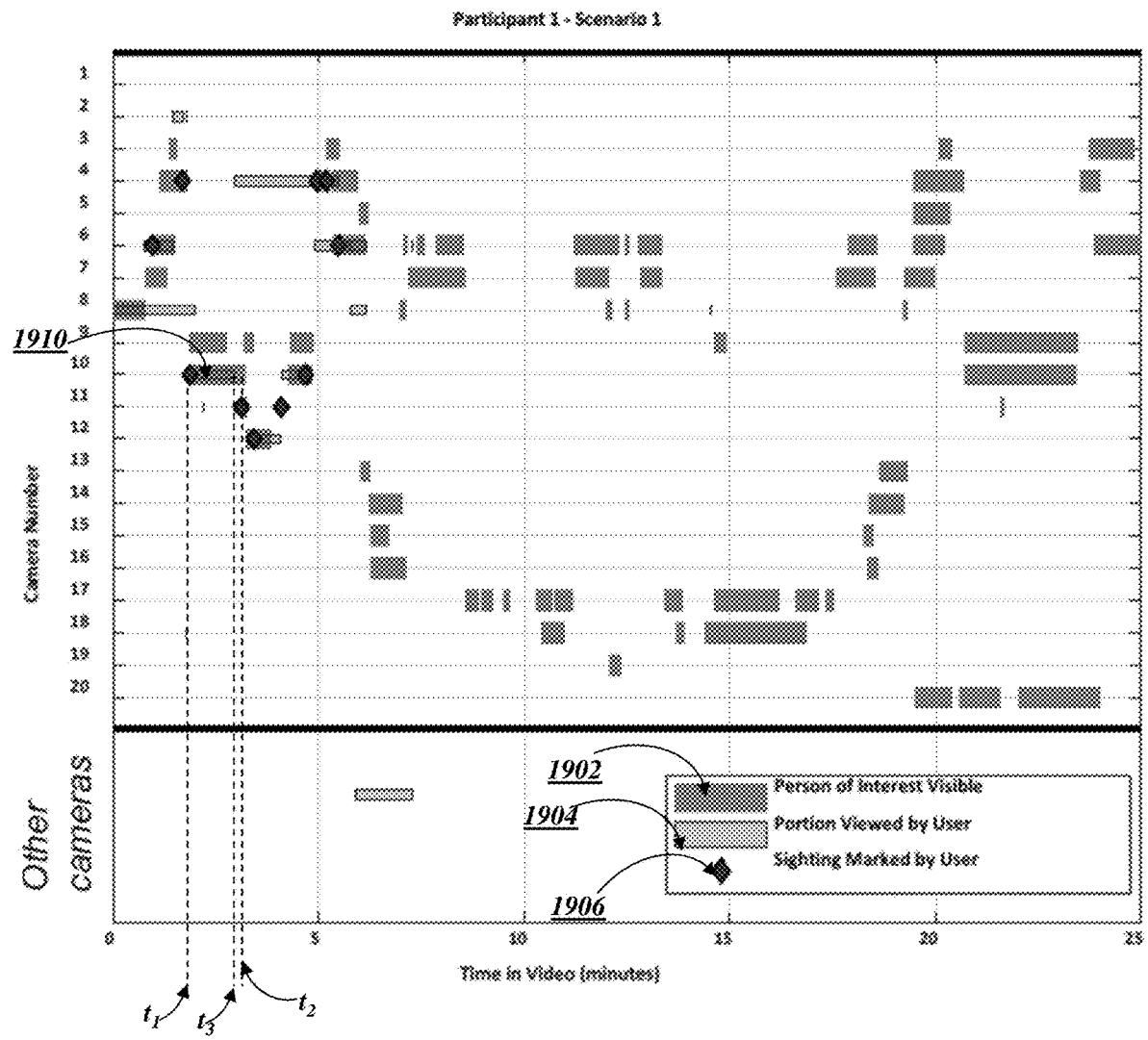
FIG. 21 depicts the amount of time that a reviewer spends reviewing video footage, produced by one or more cameras, of an object, individual, or animal, as the object, individual, or animal moves across the field of view of one or more cameras in accordance with embodiments of the current disclosure.

FIG. 21 is a graphical representation of the amount of time an object of interest is within the field of view of a plurality of cameras, the time spent by a first user reviewing video footage of the object of interest across the plurality of cameras, and making different parts of the video footage across the plurality of cameras using a video player without the aide of transition zones and anchor points, provided by path reconstruction module 950. FIG. 21 illustrates a user tracking an object of interest as the object moves through the field of view of a plurality of cameras. Block 2102 represents when the object of interest is in the field of view of a camera. FIG. 21 shows the data for a total of twenty cameras and when the object of interest is visible to each of the plurality of cameras. For example, between times $t_1$ and $t_2$ the object of interest is visible to cameras nine and ten. At time $t_1$ the user marked a portion of video footage at camera 10 in which the user noticed the object of interest using marker 2106. Also starting at time $t_1$ the user began viewing footage from camera 10 of the object of interest. Block 2140 represents a portion of camera footage reviewed by a user. The length of block 2140 denotes the amount of time that a user spends reviewing footage of given camera. For example, the amount of time spent by the user in reviewing footage from camera 10, between $t_1$ and $t_3$ corresponds to block 2110. The length of block 2110 is equal to $t_3-t_1$ which in this example, may be approximately one minute of video footage from camera 10.

Figure 22:
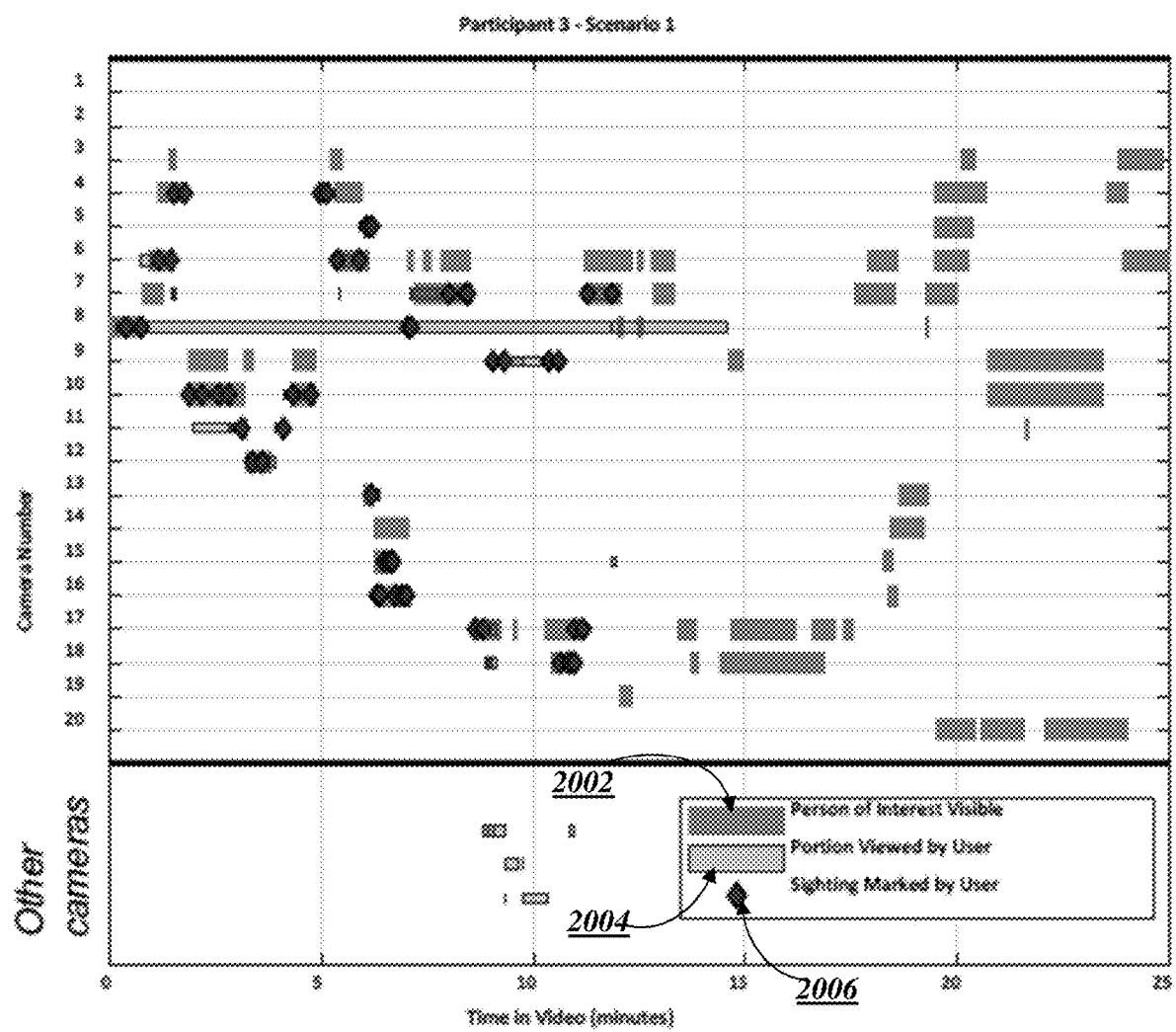
FIG. 22 depicts the amount of time that a reviewer spends reviewing video footage, produced by one or more cameras, of an object, individual, or animal, as the object, individual, or animal moves across the field of view of one or more cameras in accordance with embodiments of the current disclosure.

FIG. 22 depicts a screen shot of the amount of time an object of interest is within the field of view of a plurality of cameras, the time spent by a user reviewing video footage of the object of interest across the plurality of cameras, and making different parts of the video footage across the plurality of cameras using a video player with the aide of transition zones and anchor points, provided by path reconstruction module 950, by another user. In comparison to FIG. 21, FIG. 22 includes more markings of video footage across the plurality of cameras when an object of interest is in the field of view of the plurality of cameras. Blocks 2202, 2204, and 2206 have the same meaning as blocks 2102, 2104, and 2106, respectively. It should be noted that marker 2106 and 2206 correspond to anchor points that the user has added to the video footage generated by a given camera.

There are more markers in FIG. 22 than in FIG. 21 because the user, whose performance is captured in FIG. 22, was using transition zones and anchor points to follow the object across the fields of view of the different cameras. The transition zones facilitate location and tracking an object of interest across multiple video feeds, to allow a user to follow an object because the user can click on the transition zone to begin viewing footage of a camera that is linked to the camera feed that the user is currently viewing. Without the transition zones, a user must locate the appropriate camera from potentially several tens or upwards of one hundred cameras thereby causing the user to lose track of the object as it transitions from the field of view of one camera to the field of view of another camera. This not only allows the user to better track the object, but also increases the amount of video footage that the user can review.

Anchor points also aide the user in quickly determining which cameras the object might have been captured by in the past. For example, anchor points 1408 can provide the user with the ability to quickly review footage across any number of cameras to determine a path that the object travelled. Because anchor points can be shared among different users, if a first user has seen, and created an anchor point for the same object, that a second user is tracking, the second user can access the anchor points created by the first user to determine a path the object took prior to the second user losing track of the object. As a result, a user is able to review more video footage and more accurately mark when an object has been sighted. When a user uses the transition zones and anchor points they are able to more accurately mark (create anchor points) when an object of interest enters the field of view of camera and leaves the field of view of the camera.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A system for reconstructing video from one or more cameras to track an object across a plurality of cameras, the system comprising:
   a display;
   a memory storing computer executable instructions; and
   at least one processor programmed to:
   access stored video from a plurality of cameras;
   cause to display a first transition zone overlay over an area of a first camera image on a screen rendered from the stored video, in order to track movement of an object from a first field of view of the first camera to a second field of view of a second camera, wherein the first transition zone overlay is selectable by a user to navigate from the first field of view of the first camera to the second field of view of the second camera to track the object across a plurality of cameras; and
   responsive to selection of the first transition zone overlay by the user, cause to display a second image of the second field of view of the second camera from the stored video and a second transition zone overlay over an area of the second image as the object moves between the first field of view and the second field of view.

2. The system of claim 1, wherein the at least one processor is further programmed to:
generate one or more first anchor points in the first field of view, the one or more first anchor points representing identification of an object of interest in the first field of view.

3. The system of claim 2, wherein the at least one processor is further programmed to:
generate one or more second anchor points in the second field of view, the one or more second anchor points representing identification of the object of interest in the second field of view.

4. The system of claim 3, wherein the at least one processor is further programed to:
generate a composite video based at least in part on the one or more first anchor points, and the one or more second anchor points over time.

5. The system of claim 3, wherein the at least on processor is further programed to execute instructions corresponding to a path reconstruction module, thereby causing the at least one processor to:
reconstruct a path that the object traverses across a field of view of a plurality of cameras.

6. A non-transitory computer-readable medium storing computer-executable instructions stored therein, which when executed by at least one processor, cause the at least one processor to perform the operations of:
accessing stored video from a plurality of cameras;
causing to display a first transition zone overlay over an area of a first image of a first camera on a screen rendered from the stored video, in order to track movement of an object from a first field of view of the first camera to a second field of view of a second camera, wherein the first transition zone overlay is selectable by a user to navigate from the first field of view of the first camera to the second field of view of the second camera to track the object across a plurality of cameras; and
responsive to selection of the first transition zone overlay by the user, causing to display a second image of the second field of view of the second camera from the stored video and a second transition zone overlay over an area of the second image as the object moves between the first field of view and the second field of view.

7. The non-transitory computer-readable medium of claim 6, wherein the at least one processor is further programmed to perform the operations of:
generating one or more first anchor points in the first field of view, the one or more first anchor points representing identification of an object of interest in the first field of view.

8. The non-transitory computer-readable medium of claim 6, wherein the at least one processor is further programmed to perform the operations of:
generating one or more second anchor points in the second field of view, the one or more second anchor points representing identification of the object of interest in the second field of view.

9. The non-transitory computer-readable medium of claim 6, wherein the at least one processor is further programmed to perform the operations of:
generating a composite video based at least in part on the one or more first anchor points, and the one or more second anchor points over time.

10. A method for reconstructing video from one or more cameras to track an object across a plurality of cameras, the method comprising:
accessing stored video from a plurality of cameras;
causing to display a first transition zone overlay over an area of a first camera image on a screen rendered from the stored video, in order to track movement of an object from a first field of view of the first camera to a second field of view of a second camera, wherein the first transition zone overlay is selectable by a user to navigate from the first field of view of the first camera to the second field of view of the second camera to track the object across a plurality of cameras; and
responsive to selection of the first transition zone overlay by the user, causing to display a second image of the second field of view of the second camera from the stored video and a second transition zone overlay over an area of the second image as the object moves between the first field of view and the second field of view.

11. The method of claim 10, the method further comprising:
generating one or more first anchor points in the first field of view, the one or more first anchor points representing identification of an object of interest in the first field of view.

12. The method of claim 11, the method further comprising:
generating one or more second anchor points in the second field of view, the one or more second anchor points representing identification of the object of interest in the second field of view.

13. The method of claim 12, the method further comprising:
generating a composite video based at least in part on the one or more first anchor points, and the one or more second anchor points over time.

14. The system of claim 1, wherein the stored video is on demand video footage.

* * * * *